(12) United States Patent
Sri-Jayantha

(10) Patent No.: US 8,600,572 B2
(45) Date of Patent: Dec. 3, 2013

(54) SMARTER-GRID: METHOD TO FORECAST ELECTRIC ENERGY PRODUCTION AND UTILIZATION SUBJECT TO UNCERTAIN ENVIRONMENTAL VARIABLES

(75) Inventor: Sri M. Sri-Jayantha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 12/789,087

(22) Filed: May 27, 2010

(65) Prior Publication Data

US 2011/0307109 A1     Dec. 15, 2011

(51) Int. Cl.
*G06F 19/00* (2011.01)

(52) U.S. Cl.
USPC ............................. 700/291; 700/300; 702/57

(58) Field of Classification Search
USPC ................. 700/291, 286, 300; 702/57, 60, 64
See application file for complete search history.

(56) References Cited

U.S. PATENT DOCUMENTS

| | | | | |
|---|---|---|---|---|
| 4,091,622 | A * | 5/1978 | Marchesi | 60/641.15 |
| 5,778,675 | A * | 7/1998 | Nakhamkin | 60/652 |
| 6,959,546 | B2 * | 11/2005 | Corcoran | 60/517 |
| 7,499,816 | B2 * | 3/2009 | Scholtz et al. | 702/60 |
| 2003/0192315 | A1 * | 10/2003 | Corcoran | 60/645 |
| 2005/0146142 | A1 * | 7/2005 | Corcoran | 290/54 |

* cited by examiner

*Primary Examiner* — Kidest Bahta
(74) *Attorney, Agent, or Firm* — Thomas A. Beck; Daniel P. Morris

(57) ABSTRACT

A method to forecast the energy sources and energy sinks to facilitate continuous capacity planning, regulation and control of energy state of an entity under variable weather condition is established. Energy sources of specific focus are related to renewable energy forms from wind, solar and wave that are highly dependent on prevailing weather conditions.

25 Claims, 16 Drawing Sheets

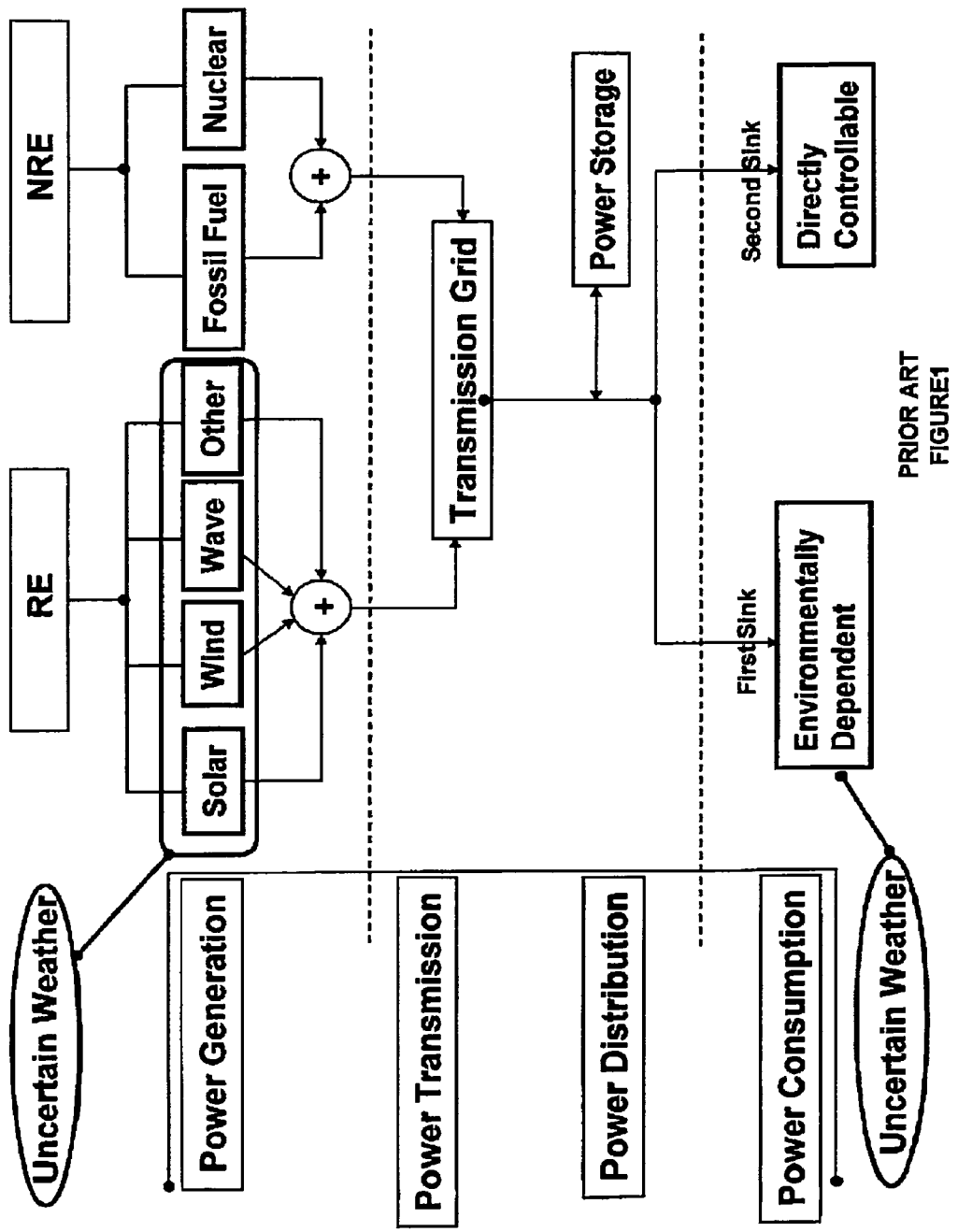

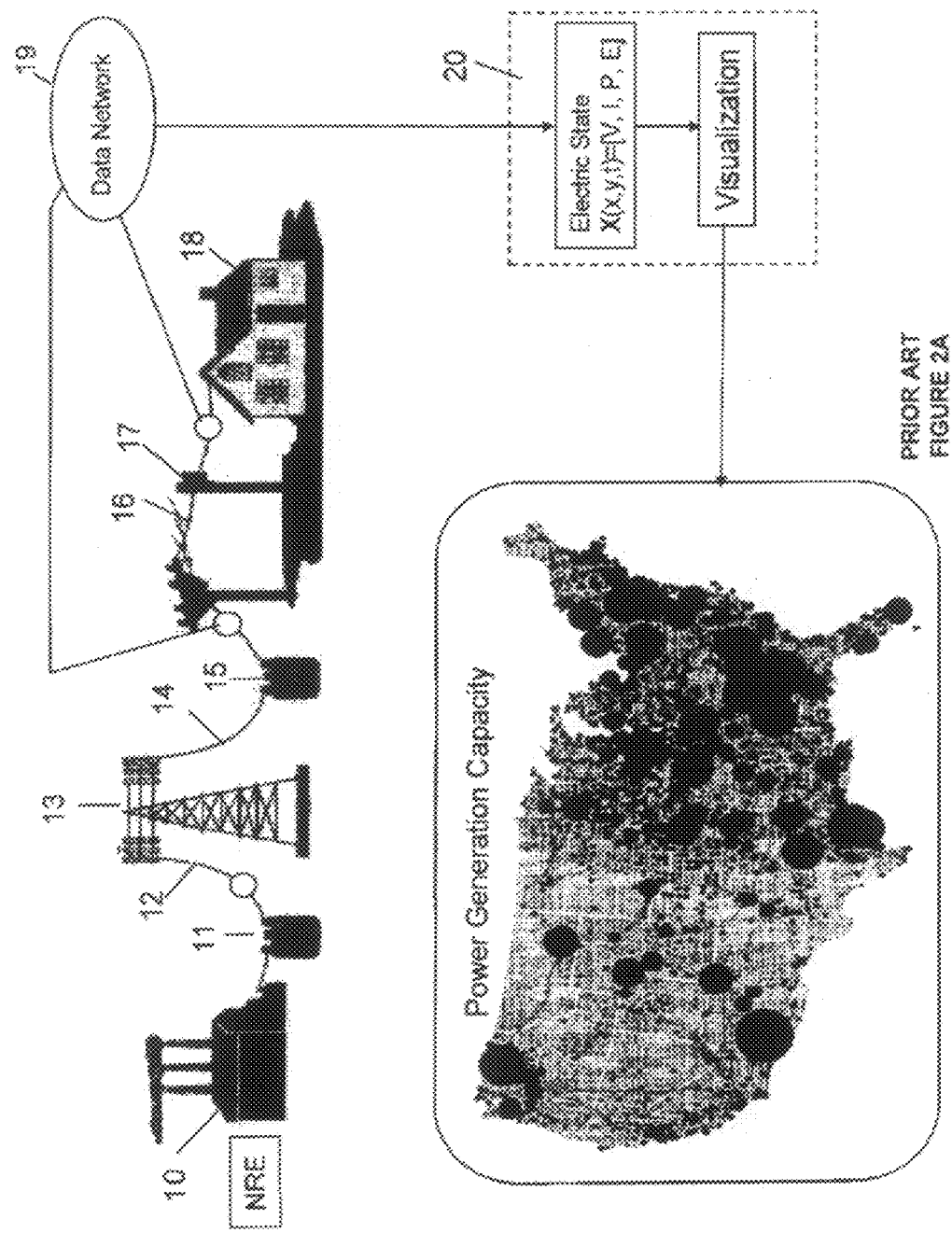

SMARTER-GRID: METHOD TO FORECAST ELECTRIC ENERGY PRODUCTION AND UTILIZATION SUBJECT TO UNCERTAIN ENVIRONMENTAL VARIABLES

BACKGROUND OF THE INVENTION

1. Field of the Invention

The invention relates to methods to forecast energy generation (source), consumption (sink) and storage so that energy balance is economically maintained with intelligent planning.

2. Description of the Related Art

Electricity is produced from non-renewable (NRE) and renewable energy sources (RE). A substantial portion of the electric power in the U.S. is mandated to be generated from renewable energy sources (RE). As shown in FIG. 1, three important sources of renewable energy are solar, wind and wave energy, which are all highly dependent on prevailing weather conditions. Forecasting the energy production and utilization levels with variable weather conditions is thus critical for effective planning, control, trading and transmission of power.

FIG. 1 is an algorithmic flow chart depicting present day stages of power applications and its relationship with renewable electric energy (RE), a first source of energy (e.g., solar, wind, wave and other) and with non-renewable electric energy (NRE), a second source of electric energy (fossil fuel and nuclear). The renewable electric energy sources each have their collective electrical energy output collected at a common source while concurrently, the non-renewable energy sources have their collective electrical energy output collected at a common source. The electrical energy stored at these sources is transmitted via a transmission grid (Power Transmission), depending upon the need of the system to a power storage means and/or to a first sink and a second sink (Power Distribution).

With respect to Power Consumption, the energy at the first sink derived from the renewable energy first source is environmentally dependent since it, and the renewable energy sources which generate the energy are totally dependent upon the weather which is uncertain. The energy at the second sink emanating from the non-renewable energy second source is directly controllable since it, and the non-renewable energy sources which generate the energy are able to supply energy upon demand.

FIG. 2A depicts a system for power transmission from a non-renewable energy source which is predictable. It shows an overall view of an NRE-based electric infrastructure. The information gathered by a sensor network can be composed into a uniform representation, denoted by electric state vector X. The collection of variables associated with an electrical system, such as voltage, current, power, energy (time integral of power), frequency, phase angle, etc., is referred to herein as its "electric state" at a given instant of time.

By way of illustration, the non-renewable energy source is a grid comprising power plant 10 that generates electricity which is directed to a transformer 11 that steps up the voltage in line 12 which line is connected to power transmission lines fixed on a high tension support 13 transmission. At a suitable location there is a line 14 to a neighborhood transformer 15 that steps down the voltage and directs the stepped down voltage to distribution lines 16 to carry electricity to houses. The voltage from distribution line 16 is transmitted to transformer 17 from which electricity enters house 18.

The state of the power system obtained by incorporating data readings from power sensors at locations A, B and C in the system and incorporating such data into Data Network 19. Power sensors A, B and C estimate the electric state by which one can map the state of power.

The state vector is a function of location (x,y) and is time (t) dependent. It can, for example, incorporate transmission line voltage (V), current (I), electrical power (P), electrical energy (E). Using moderate computing power, a real time visualization 20 of the power generated can be displayed to a customer.

Power Generation, Utilization and Storage

Given the production capacity of a plant, forecasting electric energy production from carbon or nuclear-based fuel is a trivial problem. As the percentage of contribution to the total energy mix from solar, wind and wave energy starts to grow from the present 3% to a targeted 30%, the forecasting of electric power production becomes a challenge, since solar, wind and wave-based power sources are highly dependent on weather conditions. Therefore, one of the primary focuses of the invention is to develop an algorithmic procedure to provide a robust forecasting method of renewable energy sources.

Forecasting energy utilization is also important. Drastic changes in weather patterns daily and even hourly, exacerbated by global warming, are expected to cause fluctuations in energy utilization. Winter heating and summer air-conditioning are two known energy-intensive processes that can cause power system instability, leading to blackouts and brownouts. Proper demand forecasts are required to avert these catastrophic conditions. For example, for the same outside temperature, heat loss from a building under a heavy wind can be substantially higher from that of a calm day. Thus, a capability to forecast and control the energy utilization (energy sink) becomes as critical as having an ability to forecast energy production. This is the second aspect of the invention.

Forecasting energy storage may well become more complex in the future. A hydro-electric plant provides an efficient form of energy storage, where the water is pumped back to a reservoir at a higher level using excess power generated during a period when demand is lower. The stored energy can be easily tracked by monitoring the volume of water pumped. New high energy density battery technologies and the emergence of a commuter plug-in hybrid electric vehicle (PHEV), energy storage is expected to be prevalent. For instance, the demand for charging the PHEV batteries is calculated to double energy demand in the evenings, thus requiring closer monitoring of the power distribution system.

New and yet to be invented technologies for storage of electric energy can further alter the dynamics and complicate energy generation and consumption patterns in the future. Hence, an ability to measure/estimate and track stored energy within a household or an industrial complex becomes an important component of predicting the energy state. While direct measurement of energy stored is the most convenient way to track the electric state, in some cases privacy considerations may become a barrier to measuring the stored energy within a household. Thus, innovative and less intrusive methods, coupled with an advanced metering infrastructure (AMI) will be required in the future. This is the third focus of the invention.

As the price of fuel fluctuates and weather patterns remain uncertain, the ability to forecast and maintain an economical balance between energy sources, sinks and storage elements becomes critical to an optimized energy infrastructure. Emergency petroleum reserves with unlimited capacity are not an affordable option. Excess power generation capacity can solve most of the challenges, but building and holding that capacity is also not economical. One can, however, envisage a sensible equilibrium condition at various system levels, if proactive planning and control is achieved with reliable forecast information.

Estimating "Future" Electrical State

Ongoing academic and industry research efforts attempt to improve the estimation accuracy of the electric variables of a grid by leveraging time-synchronized sensing of voltage and current phasors (or vectors). U.S. Pat. No. 7,499,816 to Scholtz discloses a method for the estimation of real-time power system quantities using time-synchronized measurements. Measurement technology, called a Phasor Measurement Unit (PMU), facilitates a new form of electric measurement suitable for characterizing wide electric grids. Two measurement technologies are widely used in the electric power industry. First one is called PMU technology which extracts magnitude and phase angle of voltage and current signals in a transmission line. This method which requires time synchronized measurements at different geographic location is made possible by the timing signals provided by GPS satellites (supporting the global positioning system (GPS)), and is expected to improve the confidence level of the estimates of an electric state. The second one is called SCADA (supervisory control and data acquisition) technology where voltage and current signals are obtained as a series of time-sampled data.

FIG. 3a depicts a summary of the disclosure of U.S. Pat. No. 7,499,816 wherein time-sampled SCADA data and GPS-synchronized Phasor PMU data are fed to a "Collect Sensor" based data base wherein the bits stored therein are converted in to physical variables X, such as volts, amps, etc.). Based upon said physical variables, a power system state is calculated according a formula. For example the formula: $z=h(X)+e$ relates the measured data "z" to electric state X using a functional relationship h(X). Since the measurements are prone to error, the term "e" represents the uncertain error in the relationship between z and X. Using simple regression method, for a collection of "z" data with preassumed function "h" a least square estimate of X can be obtained.

FIGS. 3b-d describe prior art, where the electric state is estimated from information provided by a set of sensors. The sensors either produce time domain samples (FIG. 3b) or amplitude and phase information (FIG. 3c).

FIG. 3b) depicts sinusoidal curves representing the phase shift and amplitude difference in V and I curves as a function of time (time domain samples).

FIG. 3c) depicts a phasor showing the relationship among real power, reactive power and apparent power representing the quantities as vectors. Real power is the horizontal component of "VI" and reactive power is the vertical component of "VI". Apparent power "VI" is directed along the hypotenuse V in the graph. Thus given the basic phasor measurement data, the electric power flowing in a transmission line can be readily computed.

FIG. 3d) depicts the relationship between measured and estimated voltage as a schematic example. The electric state is plotted using bus voltage as a function of time which is estimated from information provided by a set of sensors. Note that the "true" voltage is not easy to measure in the field due to sensor accuracy. However, using simple regression method and estimate of the voltage can be obtained as shown in FIG. 3d. Prior art focuses on estimating the present electric state using the sensors and formula that have been described.

Leveraging the sensor outputs, methods have been developed to estimate the present "state" of an electric grid with varying degrees of accuracy. Traditional state estimation techniques, such as least square estimator (LSE), have been applied in the electric industry since 1960 with varying degrees of success. To be economical, it is important to reduce the number of sensors while maximizing the geographic reach of estimation.

FIG. 4 corresponds to another prior art in which the state of an electric bus is "observed" without direct sensor-based measurement. Using a physics-based argument, for example Kirchoffs current law, the electric state of a bus can be computed from neighboring buses, assuming the impedances are known. Both forms of prior art contribute to estimation of the present state from a limited number of sensors.

Ultimately, the purpose of state estimation (for example, voltage and current levels of all electric buses within a designated zone) is to monitor, supervise or control an electric system in a designated zone. State estimation efforts are primarily concerned with the "present situation" and not about the future condition of the grid.

The invention presented in this disclosure assumes that improved present state estimation using SCADA, PMU and AMI will be available for efforts to forecast future operations. The invention addresses the challenge of power and energy forecasts from the production and utilization viewpoints specifically under variable weather conditions.

Reliable forecasting of electric energy production and utilization can lead to enhanced management, planning, control, trading and transmission of electricity in the future. Forecasting requires robust and computer-implementable methods.

The invention describes a method to forecast the power and energy state of an electric system. In general, the state of a system can encompass several variables. The collection of variables associated with an electrical system, such as voltage, current, power, energy (time integral of power), frequency, phase angle, etc., is referred to herein as its "electric state" at a given instant of time. This system can be an individual home, a cluster of homes, a municipality, an industrial plant, or any kind of power generation facility, among many others. The term specifically refers to entities with different physical scales. The methods presented can be integrated into a service operation, where any interested business can subscribe to receive or interact with the service provider to inquire about their past, present and future "electric state" to make effective decisions.

There is thus a need to augment the state estimation technology under development to achieve the following capabilities:

1). Forecast energy production (source) specifically from the renewable energy sector,
2). Forecast energy consumption (sink) made complicated by rapid weather changes,
3). Estimate and track energy stored in households, industrial complexes, etc.
4) Control the optimum energy utilization method to meet constraints desired by a household, an industrial complex or other entity,
5). Integrate capabilities 1.) through 4.) to provide a 24/7 forecasting service.

SUMMARY OF THE INVENTION

First, a methodology for power production (source) is disclosed in which technology-dependent parameters and weather-driven variables are jointly estimated from distributed power sensors and satellite-based cloud cover images, ground-based wind velocity data and ocean-based wave height/period data respectively.

Secondly, a method to forecast national power utilization (sink) levels is disclosed in which the impact of weather (temperature, humidity and wind) on household and industrial consumption is correlated to establish a model from historical data and applied for enhanced accuracy of consumption projection.

Thirdly, a method to estimate stored energy available for time delayed consumption which is critical to overall energy demand forecasting is disclosed. Finally, by integrating the three categories, production, utilization and storage, a for-profit power-forecasting service model is established.

The quality of the services provided to energy industry can range from offering an "energy map" displaying the power generation or consumption forecast to detailed databases of the "energy-state" of a geographic entity.

FIG. 2B shows the renewable augmented unpredictable sources of energy (e.g., solar, wind and wave) contribution to the electric grid. Power generation and consumption at various distribution points are made available through an advanced metering system and a networked array of sensors. A service business entity receives multi-channel measurements derived from a sensor network and detailed characteristics of the present and future weather conditions. Information, such as present and future weather, geographic location of alternative energy sources, etc., are ultimately integrated and processed to forecast the power generation potential and utilization of a geographic entity. Several high performance computer systems will be required to achieve this functionality.

Presently, the contribution to total electric energy production from renewable resources is substantially lower than that from NR sources. Incentives to use coal will decrease as carbon count becomes a liability. Nuclear energy is expected to increase its share, even though concerns about safety continue to linger. The availability of both sources is reasonably predictable. Natural gas, which has high energy density and low carbon emission, is considered to be more valuable for heavy transportation vehicles as a replacement fuel than as an electricity source. In the future, it may become less attractive to produce electricity from static, central power plants. Thus, wind, solar and wave-based energy sources are anticipated to become a substantial portion of the total energy generated within a decade or two. However, these sources are less dependable than NR ones because they are dictated by uncertain weather conditions.

BRIEF DESCRIPTION OF THE SEVERAL VIEWS OF THE DRAWINGS

The invention will now be described in greater detail in the following description of the preferred embodiments taken in conjunction with the accompanying drawings.

FIG. 1 depicts renewable and non renewable sources of energy

FIG. 2A depicts an overall view of a non renewable based electric infrastructure.

DESCRIPTION OF THE PREFERRED EMBODIMENT

In the following detailed description, reference is made to the accompanying drawings that show, by way of illustration, specific embodiments in which the invention may be practiced. These embodiments are described in sufficient detail in the specification and drawings to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled.

1. Forecasting Power from Renewable Sources

Information from wind, cloud and wave characteristics can be profitably used to forecast power generation from RE sources. For example, from the position of the sun, conditions of the cloud cover (including size, altitude and optical thickness) and the characteristics of the solar array, the effective light energy density received by a solar panel is estimated. Light energy shed on a solar array with a known conversion efficiency determines the expected electric energy produced by the same array.

From wind velocity, temperature, density and direction, the energy produced by a wind farm can be computed. Observe that if the power generated is measured directly from a solar or wind farm, then "present" power estimation is not particularly useful. However, by estimating and correlating with the measured data available in hand, the forecasting accuracy of the same algorithm is enhanced. Employing a minimum likelihood parameter estimation method, the accuracy of cloud-to-power, or wind-to-power models is enhanced. Similarly, a wave-based power forecasting model is established.

Figure 2B:
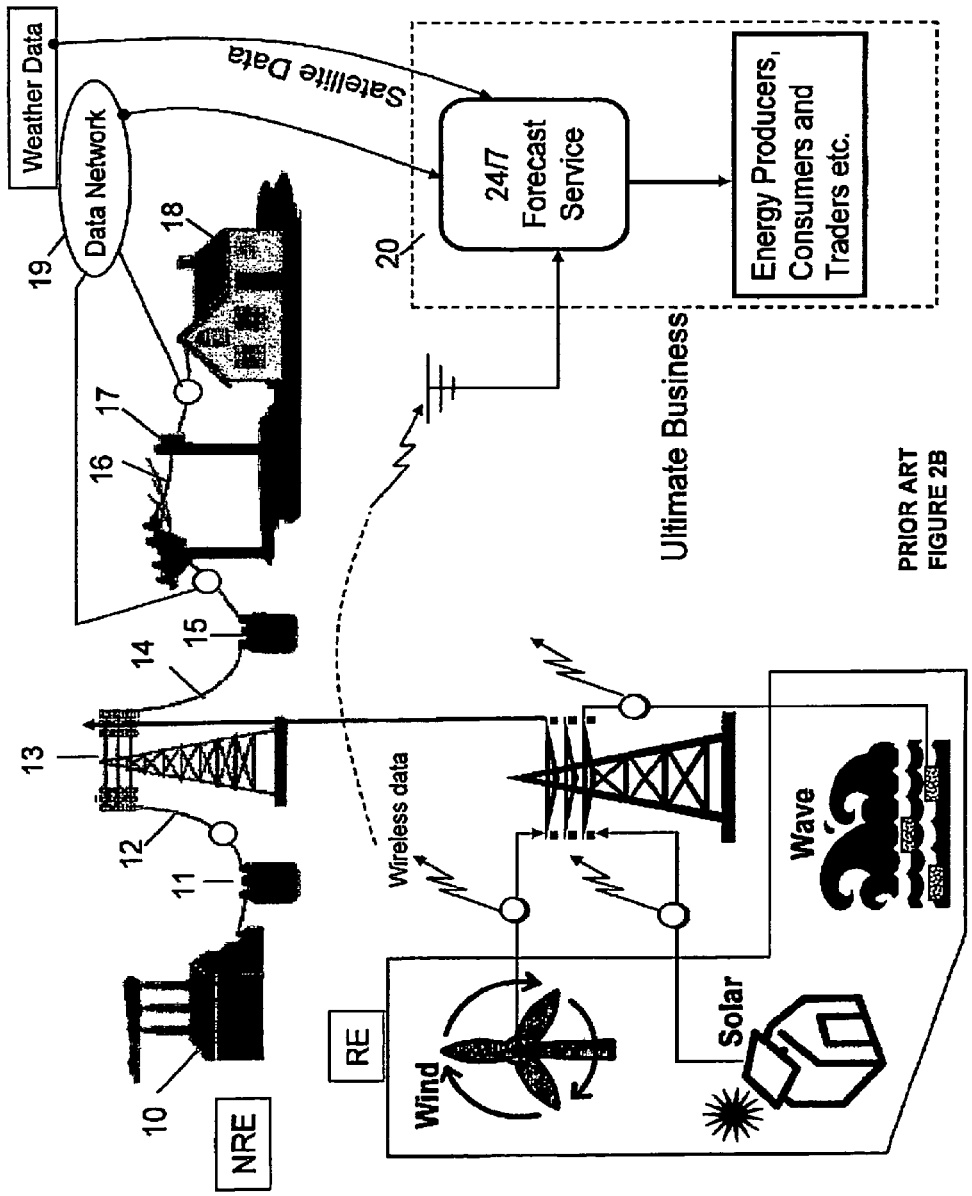
FIG. 2B depicts augmented unpredictable sources of energy contribution to an electric grid.
Figure 3:
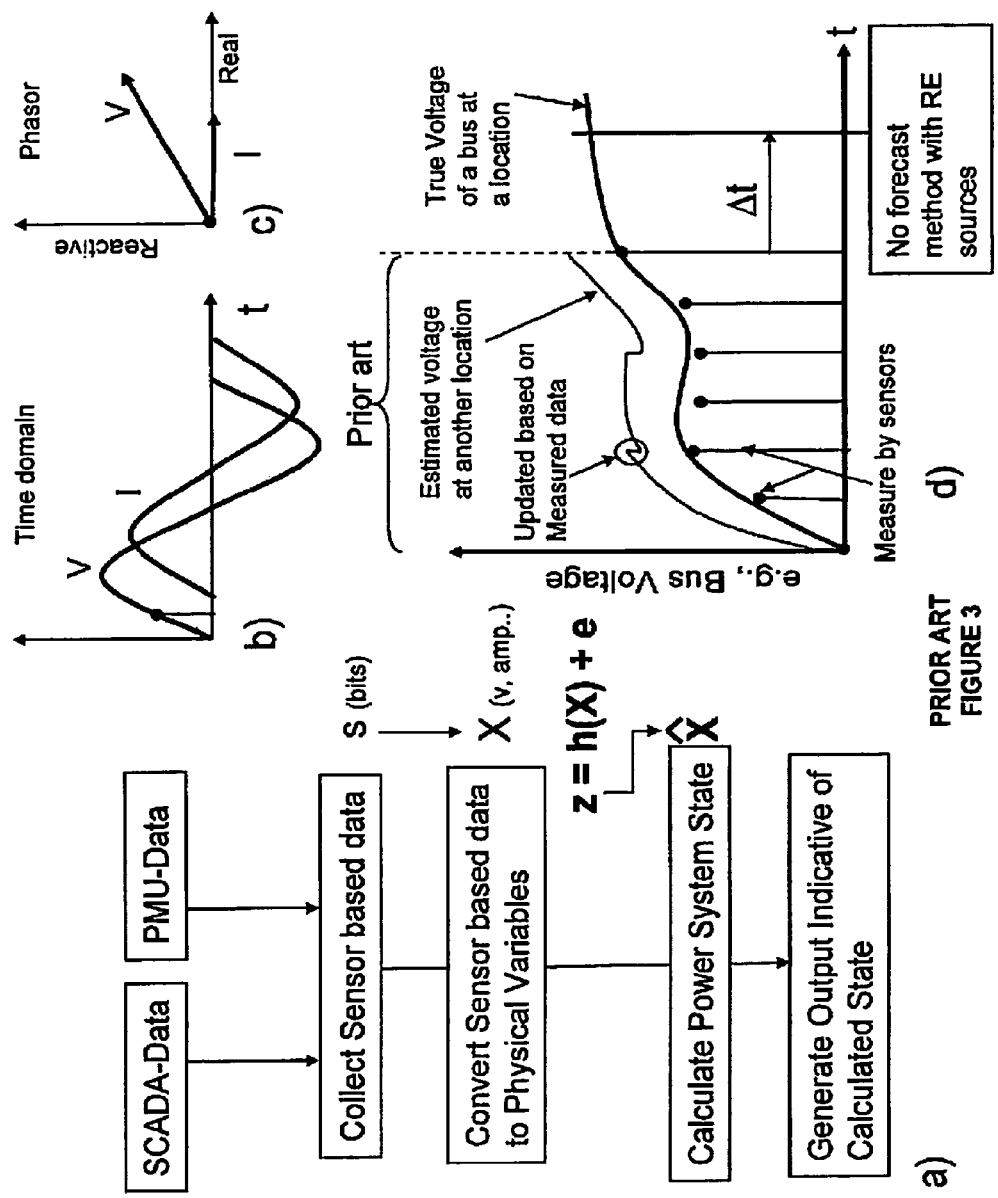
FIGS. 3(a) to (d) depict a prior art disclosure wherein the electric state is determined from information provided by sensors.
Figure 4:
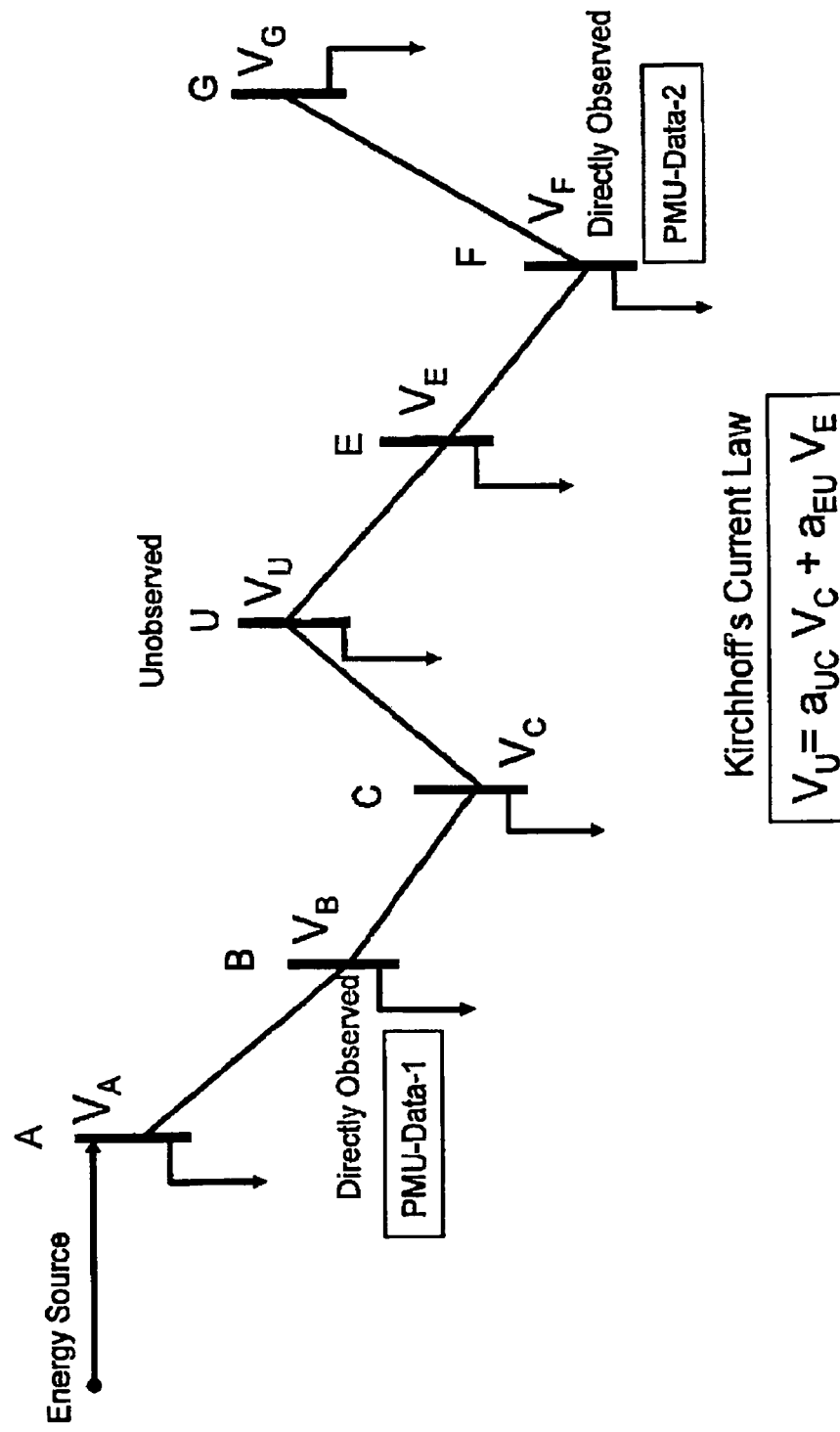
FIG. 4 is a summary of a prior art disclosure wherein the state of an electric bus is observed without direct sensor based measurement.
Figure 5:
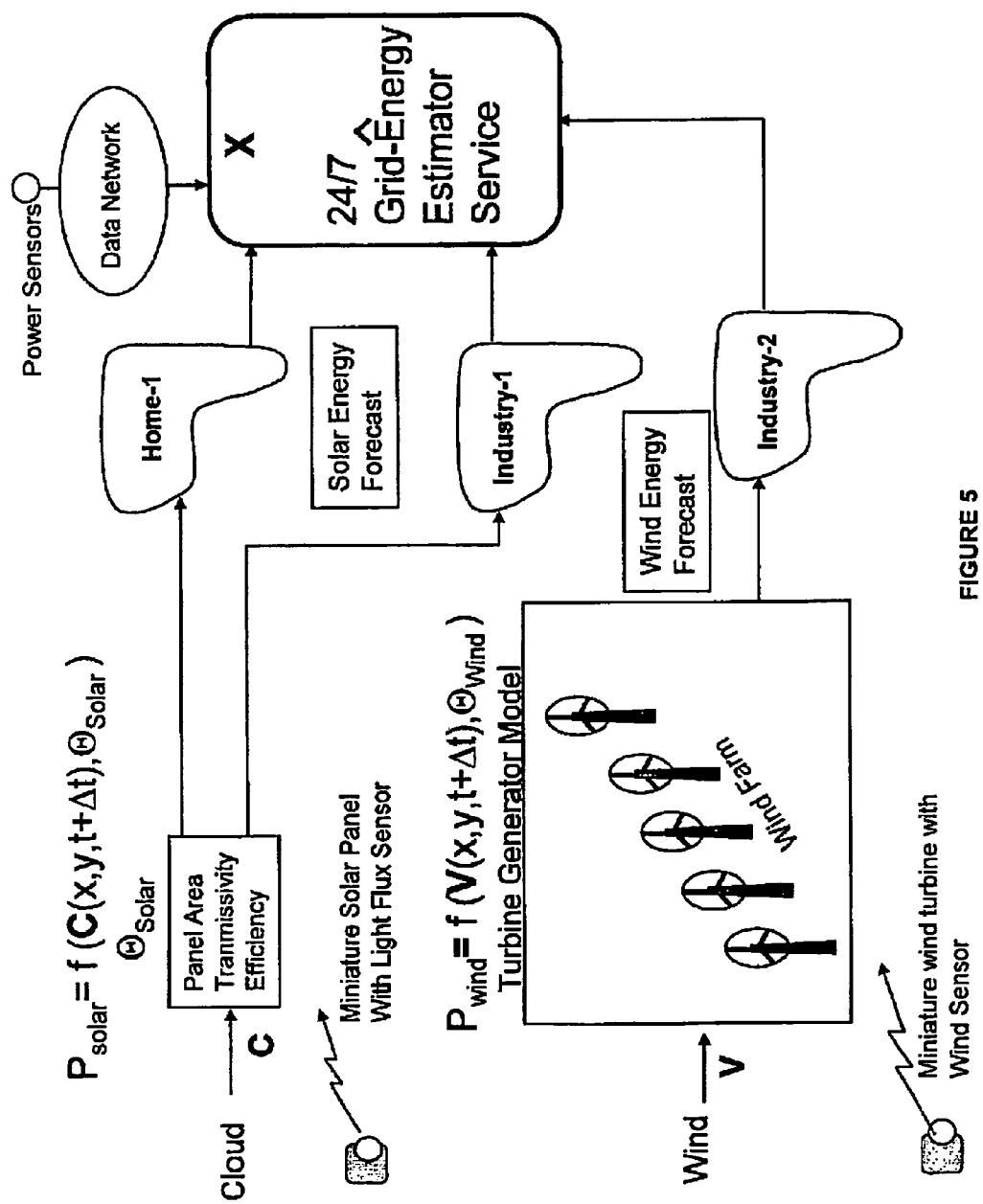
FIG. 5 shows a pictorial view of variables contributing to the power production process.
Figure 6:
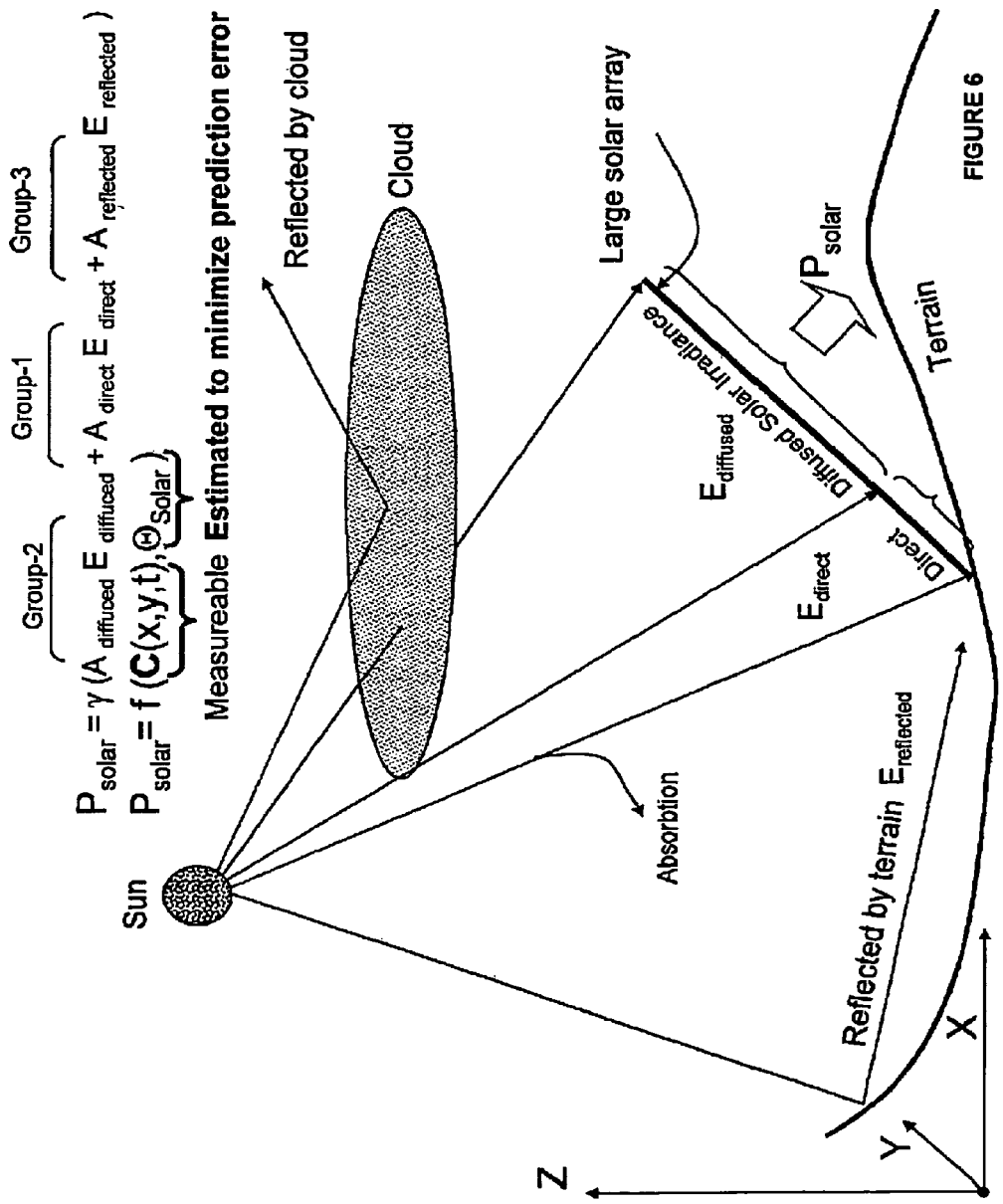
FIG. 6 illustrates how solar power is affected by various environmental parameters.

FIGS. 5, 6. 7A and 7B and 8 describe a forecasting method for solar/wind power production.

Figure 7A:
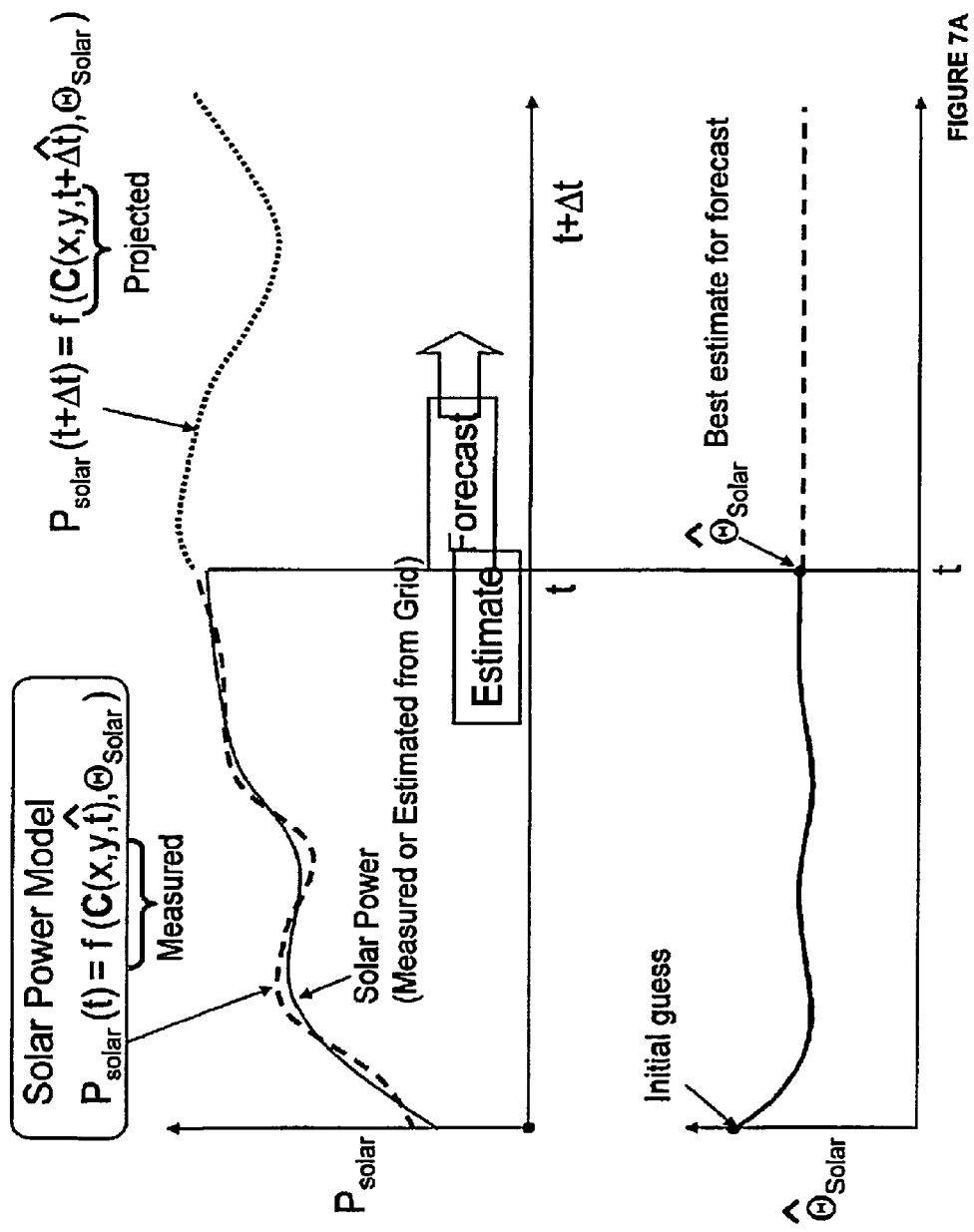
FIG. 7A illustrates the estimation of unknown parameters and forecast of power according to the present invention.
Figure 7B:
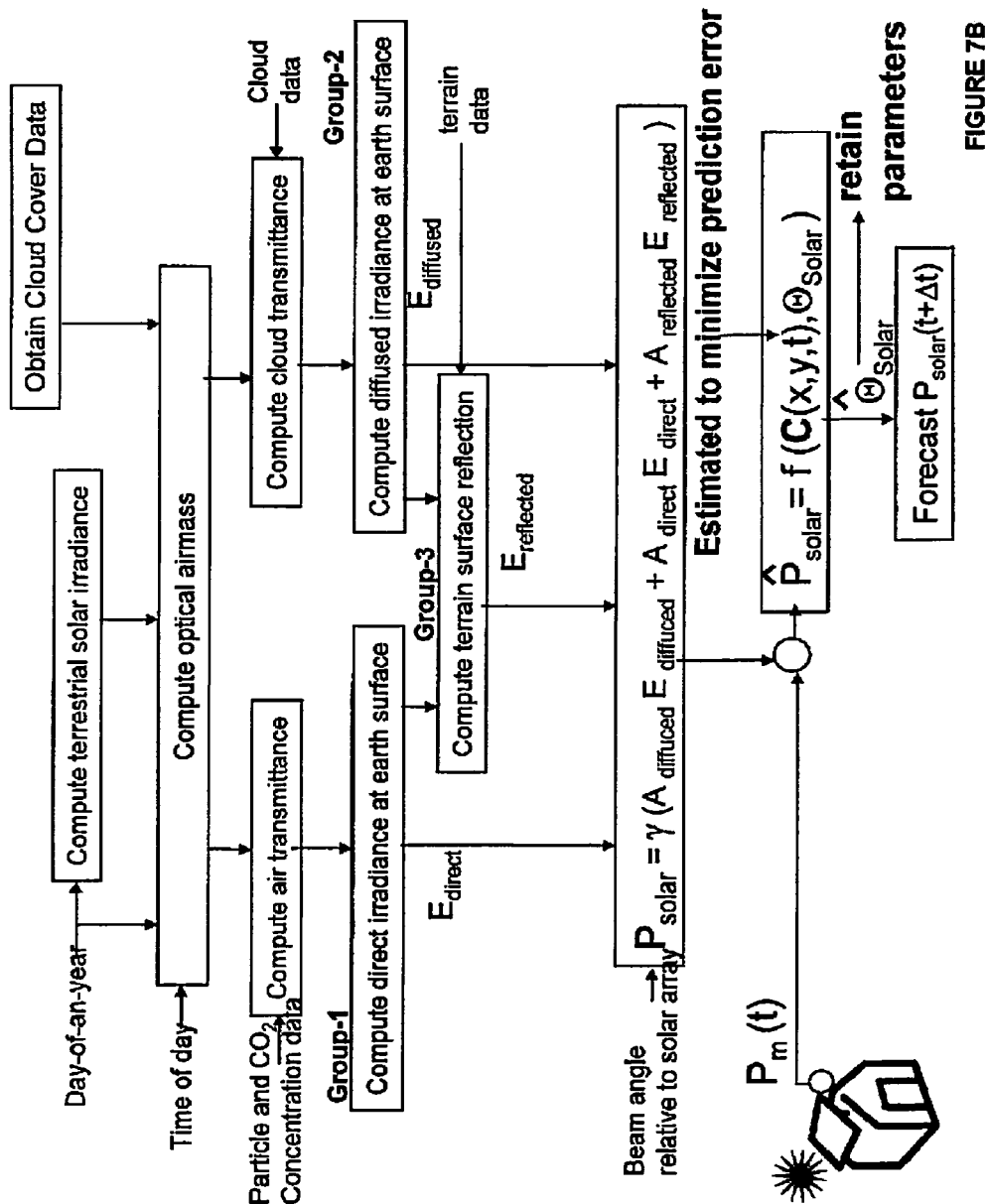
FIG. 7B is a flow chart-based representation of the method used for solar power projection according to the present invention.
Figure 8:
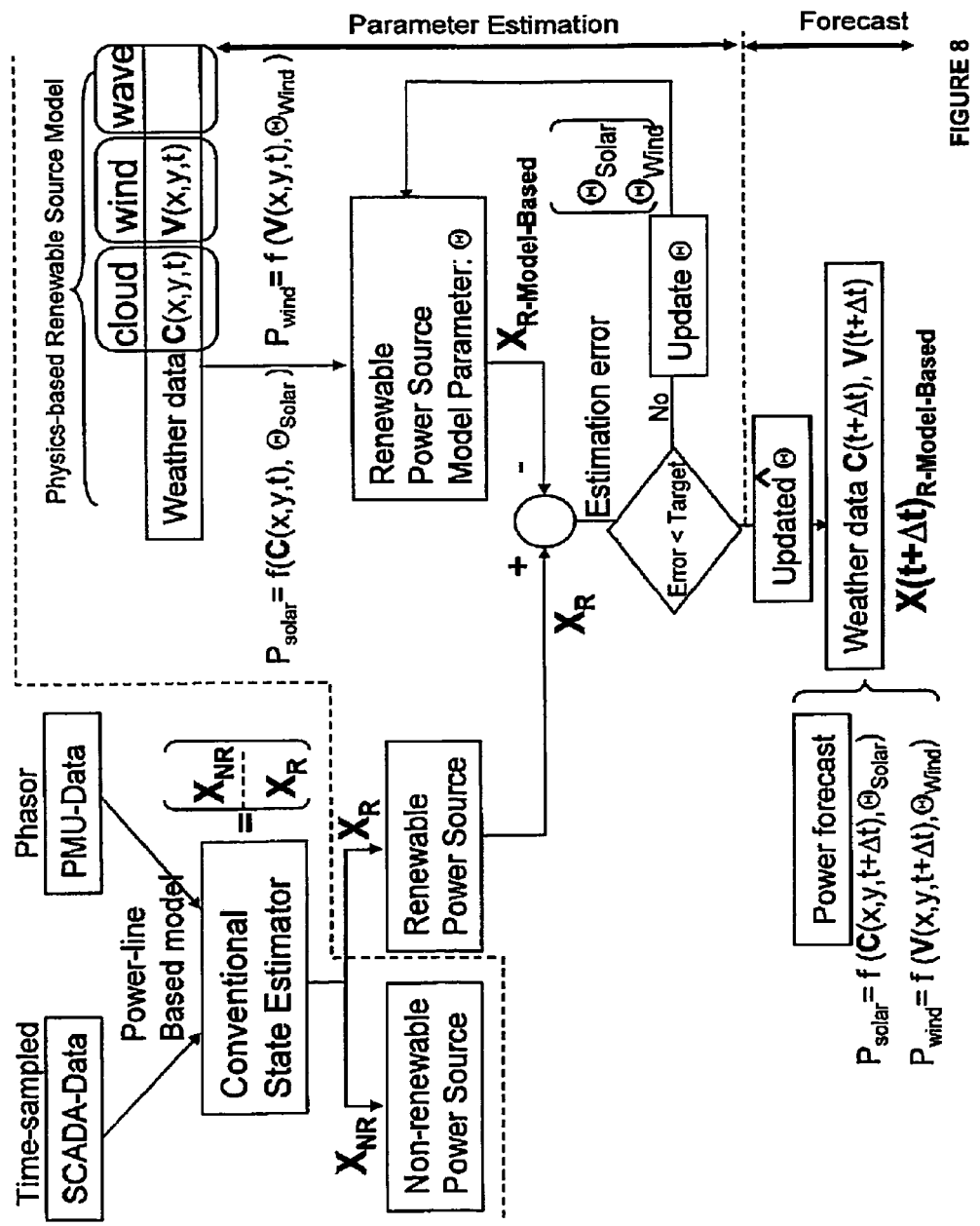
FIG. 8 is a power generation forecast model comprising a comprehensive flow chart to implement the forecast method for various forms of renewable energy sources according to the present invention.

FIG. 5 shows a pictorial view of variables contributing to the power production process. FIG. 6 shows how solar power is affected by various environmental parameters. FIG. 7A illustrates the estimation of unknown parameters and forecast of power. FIG. 7B shows a flow chart-based representation of the method used for solar power projection. FIG. 8 shows a comprehensive flow chart to implement the forecast method for various RE sources.

The invention first demonstrates how to compute solar power using either physics-based or empirical models. Solar and wind energy producers are assumed to provide a real time measure of the power produced, Pm(t), by the respective farms.

1.1 Forecasting Solar Power

Average sun irradiance (power density) is about 1367 W/m2 before it reaches the earth's atmosphere. The irradiance is progressively absorbed as it travels through the earth's atmosphere. Particulate matter and $CO_2$ reduce the irradiance at ground level. Satellite imaging can provide cloud maps with associated cloud properties. Other relevant parameters such as $CO_2$ content, or even a map of cloud transmissivity can also be obtained using remote sensing satellite technology.

For solar power generation, by obtaining present aerial cloud cover data C(x,y,t) from satellite images, the cloud boundary is first identified. Vector C(x,y,t) represents a collection of all known geometric parameters relevant for computing the incident solar power on a farm.

Depending on the time of the day and day of the year, the sun irradiance reaching the earth's surface under ideal atmospheric conditions can be estimated using a well-established relationship. The irradiance function at a point on the earth surface under ideal conditions resembles a semi-sinusoidal wave form. However, as the sunbeam travels through non-ideal atmosphere and cloud cover the net power received by a solar farm is correspondingly reduced.

As defined in FIG. 6, solar irradiance reaches the solar farm through three distinct paths 1.) Directly through the atmosphere, 2.) Diffused through a system of clouds, and 3.) Reflected from other objects (such as snow cover on a terrain). As sun position changes and drifting cloud properties vary, the three components of irradiance can change, but can be computed provided all the relevant parameters are known.

The solar power produced:

$$P_{solar} = \eta(A_{diffused}E_{diffused} + A_{direct}E_{direct} + A_{reflected}E_{reflected}) \quad (1)$$

where η represents the conversion efficiency of the solar array. Observe that the effective area (A) presented to each irradiance component itself will vary with time. The value E in the equation is the radiation intensity from the sun conveniently given in joules/m²/sec. Depending on the type of tracking mechanism used by the solar array, the effective area can change with sun position and should be accounted for.

The operations involved in eq. (1) can be generalized and viewed as the following function:

$$P_{solar} = f(C(x,y,t), \theta_{Solar}) \quad (2)$$

where properties prone to error, such as cloud transmissivity, and atmospheric $CO_2$ content, are represented by a parameter vector θ(t) whose approximate value or best initial guess can be obtained first and refined later from actual measurement. Other cloud-related geometric parameters are represented collectively by C(x,y,t).

The amount of solar power converted to electricity power $P_{solar}(t)$, represented by function $f(C(x,y,t), \theta_{Solar}(t))$, is computed next wherein $\theta_{Solar}(t)$ is parameter vector as detailed below. Referring to FIG. 7A, depicting estimated $P_{solar}$ and $\theta_{Solar}$ estimate t and forecast Δt, if the initial guess of the parameter vector $\theta_{Solar}(t)$ is close to its actual value, the measured power and estimated power will be nearly equal, and, under this condition, the forecast for solar power in a future time t+Δt will be given by $f(C(x,y,t+\Delta t), \theta_{Solar}(t))$. However, if the error in the estimated power is significantly different from the measured power, the value of the parameter vector is refined (or estimated) using measurements available up to the present, and the forecast is made using a newly updated parameter vector as discussed later.

FIG. 7B provides the steps to compute the solar power according to an embodiment of the present invention. The computation of the solar power produced pursuant to equation 1 above (See also FIG. 6) is:

$$P_{solar} = \eta(A_{diffused}E_{diffused} + A_{direct}E_{direct} + A_{reflected}E_{reflected})$$

wherein $A_{direct}E_{direct}$ is designated Group 1, $A_{diffused}E_{diffused}$ is designated Group 2 and $A_{reflected}E_{reflected}$ is reflected is designated Group 3.

FIG. 7B depicts how Groups 1, 2 and 3 are determined. The data obtained from Groups 1, 2 and 3 are collated along with a real time measure of the power produced, $P_m(t)$ to result in the function $P_{solar} = f(C(x,y,t), \theta_{Solar})$ and using the parameter vector θ, Forecast $P_{solar}$ (t+Δt) is obtained 1.2 Forecasting Wind Power For wind systems, local incident wind velocity and density are critical to the power produced by a wind farm. Ref. [6] describes a method to identify geographic locations where a wind farm could be built for potentially optimum power generation. It uses long-term data to develop the method but does not attempt to use weather forecast to estimate actual power generated in real time.

Vector V(x,y,t) represents a collection of variables required for wind power estimation. For the forecast of wind stream line data, and preferably data available from a wind-farm, using sensors measuring speed, density (or temperature) and direction, the wind power available to a wind turbine is computed as:

$$P_{wind-input}(t) = [AV(t)][(\tfrac{1}{2})\rho(t)V^2(t)] \quad (3)$$

where the velocity V(t) is the vector normal to the plane of rotation of a wind turbine with an area A and ρ is density of air as a function of time t.

The corresponding electric power output due to wind can be written as:

$$P_{wind} = \eta[P_{wind-input}] = f(V(x,y,t), \theta_{Wind}) \quad (4)$$

Each wind-turbine has a conversion efficiency η defined in the form of graphical data or a closed form formula, usually made available by the manufacturer. For example, conversion efficiency could be a nonlinear function of normal wind velocity and rotation speed. Thus, the estimated electric power $P_{wind}$ (t) can be computed from eq. (4) along with readily available efficiency data. Equation (4) can be viewed also as a function=$f(V(x,y,t), (\theta_{Wind})$, where $\theta_{wind}$ represents a parameter set that may require refinement based on measured power data.

If measured and estimated power variables are nearly equal, then future wind power production can be easily forecast using future wind data by repeating the same computational process defined in section 1.1. However, if the error is significant, then a correction factor, or in general a new parameter vector, is estimated from past data before a forecast is made.

1.3 Forecasting Wave Power

The estimation methodology can be replicated for a system generating energy from waves as well. In this case, the knowledge of wave characteristics, such as wave height, velocity and periodicity, etc. would be the weather-dependent variables. Unlike solar and wind power generators, wave-based systems are continuing to evolve as new inventions as put to practice. Variety of electromechanical configurations as a result need to be considered.

Mechanisms that convert wave motion into useful electromechanical function can be either fully immersed below the water surface or can be completely floating. The wave height, velocity and length are primary drivers of the energy conversion process. Hence the efficiency of energy conversion needs to be represented as a dependent function of the wave-related variables.

Once the physics of power generation is captured in the form of an analytical formulation it can be represented as, $$P_{wave} = f(W(x,y,t), \theta_{Wave})$$

where $W(x,y,t)$ represents wave-related properties at time "t", and $\theta_{wave}$ corresponds to parameters requiring estimation to minimize the forecast error. The technique defined in section 1.1 is then repeated to forecast power from a wave-based power generator.

The World Energy Council has estimated the market potential for wave energy to be in excess of 2,000 TWh/year, representing a capital expenditure of more than £500 billion. This is broadly equivalent to the existing deployed markets for nuclear and hydroelectric power. This can also be compared to the market for solar photovoltaic panels (approximately 2,000 MW installed worth £8 billion in 2006) and that for wind turbines (approximately 15,000 MW worth £18 billion in 2006) with both markets increasing at historical rates of 20-30% per annum. Key to development of these markets are 'market enablement mechanisms' of feed in tariffs that typically provide solar PV with support of 30-50 c/kWh and wind with 8-15 c/kWh recognizing the potential for ongoing cost reductions, industrial-economic benefits and meeting security of supply and environmental objectives. Wave energy has lower 'opening' costs than wind did 25-30 years ago, lower current costs than solar PV and the potential to become one of our least cost generating options over time, providing that deployment into the market allows continued cost reductions through the process of learning by doing.

1.4 Parameter Estimation Method:

The present invention utilizes "estimation theory" which is an interdisciplinary field consisting of and statistics, signal processing and engineering concepts. It deals with estimating the values of parameters based on measured/empirical data that inevitably has a random error component. The parameters describe an underlying physical setting in such a way that the value of the parameters affects the estimated value of the measured data. An estimator attempts to evaluate the value of the unknown parameters using the field measurements so that the field measurements and expected measurement corresponding the estimated parameters do not diverge arbitrarily over time.

In estimation theory, it is assumed the measured data is corrupted with a random component (with a probability distribution) and is dependent on the parameters of interest. For example, in electrical communication theory, the measurements which contain information regarding the parameters of interest are often associated with a noisy signal. Without randomness, or noise, the problem would be deterministic and estimation would not be needed.

The entire purpose of estimation theory is to arrive at an estimator, and preferably an implementable one that could actually be used in practice. The estimator takes the measured data as input and produces an estimate of the parameters.

It is also preferable to derive an estimator that exhibits optimality. Estimator optimality usually refers to achieving minimum average error over some class of estimators, for example, a minimum variance unbiased estimator. In this case, the class is the set of unbiased estimators, and the average error measure is variance (average squared error between the value of the estimate and the parameter). However, optimal estimators do not always exist.

As noted above, the estimator, utilizes the error between the estimated power ($P_e(t)$) and the actual power ($P_m$) to determine the best parameter value θ-hat (or $\theta_e(t)$). The subscript "e" refers to estimate of the corresponding variable.

Whenever the computed power based on estimated parameter, denoted generally as $P_e(t)$, deviates from the measured value by a pre-selected error margin, a parameter estimation process, such as maximum likelihood estimate (MLE), is activated to adjust the parameter vector $\theta_e(t)$. For example, in the case of solar power, the assumed cloud transmissivity may be biased due to different kinds of water and ice particles, warranting a better parameter estimate. Similar arguments can be pursued for wind and wave energy, where at least one component of the parameter vector is likely to be more uncertain than others.

In the remaining discussion the solar example is used as the prototype to describe the estimation method. The parameter estimation can be iterative in nature, and the process is repeated until the parameter vector is adjusted to minimize the error between the estimated and measured power.

Observe that different cloud patterns (cirrus vs. cumulus) with same the cloud area can produce distinctly different solar-to-electric power conversion rates. Hence, the cloud cover data should exploit cloud-type information over a period of time to enhance the forecasting accuracy by associating the estimated parameter vector with cloud type.

Since the cloud cover data, in addition to area and type, can have multiple parameters associated with it, as represented by vector $\theta(t)$, (e.g., cloud thickness, reflectivity, altitude, surrounding humidity, dust intensity), necessary for the computation of incident energy on solar panels, the estimated power and measured power can deviate by an amount $P_e(t) = P_e(t) - P_m(t)$. Using a parameter estimation method, such as maximum likelihood estimator (MLE), one or more uncertain parameters of $\theta(t)$ related to the cloud cover data are computed using a time sequence of the $P_m(t)$. The goal is to minimize the deviation error $P_e(t)$ within a selected time interval. The error minimizing parameter set $\theta_e(t)$, is retained for the purpose of near term forecasting. By receiving anticipated "cloud cover" data at time t+Δt, the new forecast for $P_e(t+\Delta t)$ is finally obtained.

For longer term forecasting, the type of cloud itself may change drastically, for example, from cumulus to cirrus, rendering the most recent estimate $\theta_e(t)$ erroneous. Hence, a knowledge base of the relationship between cloud characteristics and corresponding $\theta_e(t)$ from previous estimation cycles is retained (i.e., stored) by the computer for longer term forecasts.

To improve forecast robustness, the interim computations can be verified by embedding an instrumented (Pyranometer) miniature solar panel among the deployed large area solar panels. The measured irradiance data in this case can help improve the estimation of $\theta(t)$ for the local area.

The computational steps described using FIG. 7B using solar power forecast as an example can be generalized to embrace all renewable sources of power contributing to an electric grid of interest. FIG. 8 is an algorithmic flow chart depicting system embodied in the power generation forecast model used in accordance with the present invention. The measured power $P_m(t)$ which is the key variable required to drive the parameter estimation process is an element of a generalized electric state vector $X(t)$ shown in FIG. 8. Electric industry in its present form does not differentiate the type of energy source used to feed the electric grid. This standard must be modified to include the type of energy source associated with the variables in vector $X(t)$ in order to better facilitate the monitoring and control of the grid in the future. The size of the vector $X(t)$ depends on the size of the geography under forecast consideration. It is understood that power generated by both non-renewable and renewable sources are embedded in the vector data $X(t)$ and are denoted by $X_{NR}$ and $X_R$ respectively. Furthermore, when multiple renewable energy sources are connected to the grid, it is understood that the vector $X_R$ contains all the relevant power data necessary to estimate the respective parameters.

The information gathered by various sensor network is typically processed and composed into a uniform representation, denoted by electric state vector $X(t)$. (As noted above, the collection of variables associated with an electrical system, such as voltage, current, power, energy (time integral of power), frequency, phase angle, etc., is referred to herein as its "electric state" at a given instant of time.) Normal purpose of electric state estimation (for example, voltage and current levels of all electric buses within a designated zone) is to monitor, supervise or control an electric system in a designated zone. Electric state estimation efforts in the industry are primarily concerned with the "present situation" and not about the future condition of the electric grid. Time sampled SCADA data, and phasor PMU data are typical examples of a sensor network, and the sensed data is processed and organized to provide the vector $X(t)$ as a function of time which is expected to fluctuate through out a day due to variation in industrial and consumer demand.

In the present invention, the renewable power source data embedded in $X_R$, is utilized to obtain a statistically optimum value for the parameter vector $\theta_e(t)$. This requires a model based estimate of power using weather data comprising cloud ($C(x,y,t)$), wind ($V(x,y,t)$) and wave data for a given parameter vector $\theta_e(t)$ and is denoted by $X_{R\text{-}Model\text{-}Based}(t)$. The analytic functions "f" describing the power generation models for solar, wind and wave have been described by equations (1) through (5). The difference between measured power and model-based estimated power is the estimation error. The parameter vector $\theta_e(t)$ is updated periodically until it converges to a stable value. Once the best value for $\theta_e(t)$ is estimated, forecast of power generation for weather conditions reflected by cloud cover ($C(x,y,t+\Delta t)$), wind ($V(x,y,t+\Delta t)$) etc. at time ($t+\Delta t$) is easily estimated using the respective power generation models represented by equations (1) through (5).

Whenever the power estimation error is within a target value, the update process for the parameter vector can be temporarily suppressed. Thus the parameter estimation and power forecast operations are sequentially and repetitively performed to sustain the forecasting service.

2. Power Utilization Forecast

Figure 9:
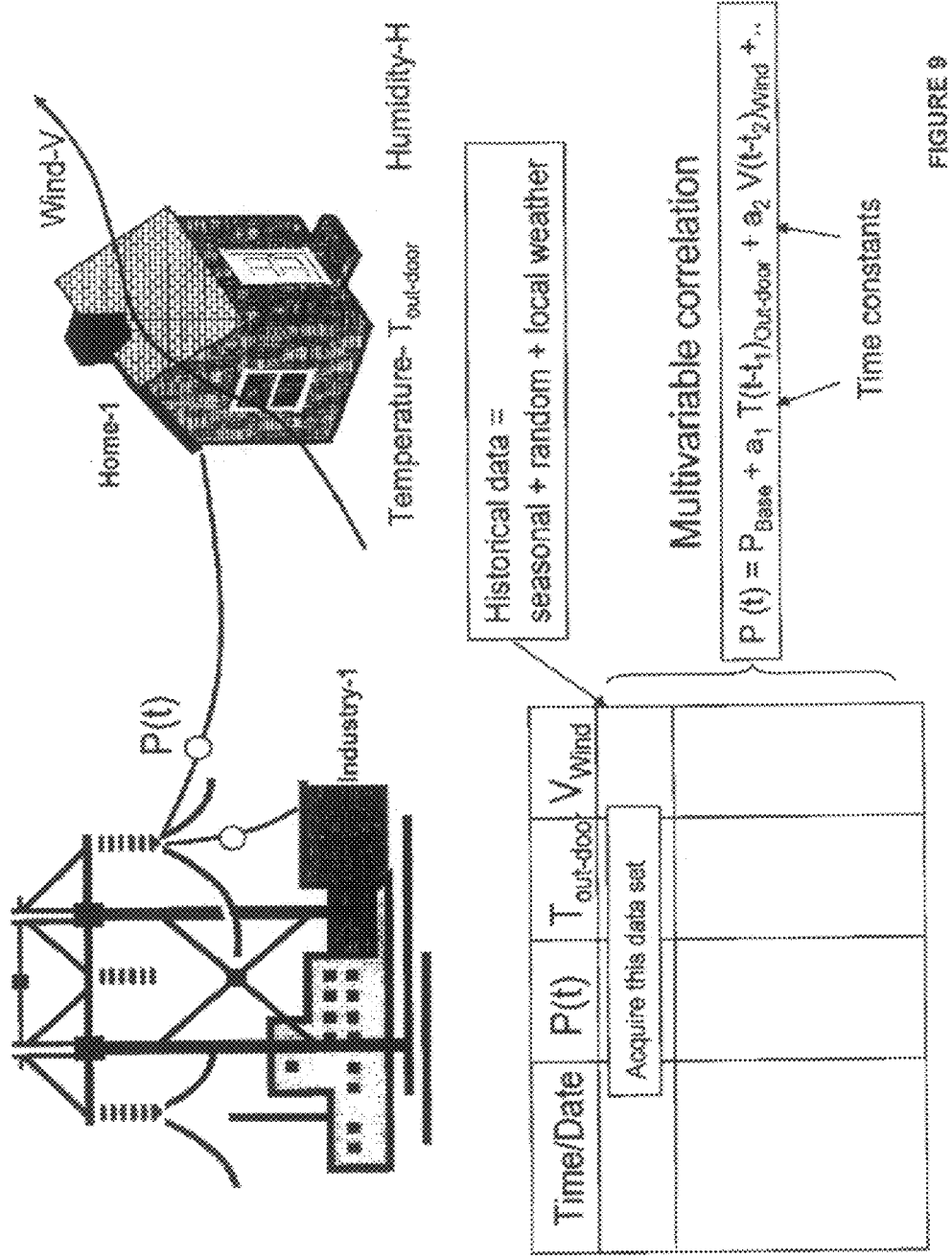
FIG. 9 is a forecast model for power utilization showing the factors affecting the power consumption of a household.

Different factors contribute to the power consumption of households, factories and other entities. FIG. 9 shows the factors affecting the power consumption of a household. United States Patent Application 2004/0102937 A1 by Ibrahim, the contents of which are incorporated by reference herein, discloses a seasonal autoregressive moving average model to capture the power consumption due to seasonal variations and a linear regression method to estimate the peak-power from outdoor temperature. It is a step in the right direction to formulate a systematic methodology to forecast demand. The reality is more complicated, and multiple factors affecting the power demand must be taken into account.

The dominant factor affecting power consumption for an industry may be related to its manufactured product. For example, a steel mill may consume a substantially more power for its production process compared to normal heating or cooling of its facility. The most robust method to forecast energy utilization is to collect historic consumption patterns, along with environmental variables, and perform a multivariable regression. As shown in FIG. 9, various independent variables such as outdoor temperature, wind conditions, humidity, etc. are also known to contribute to electric power consumption. Since buildings have thermal inertia, it is important to consider the effect of any time lag ($t_1$, $t_2$) associated with each building for better short term forecasting accuracy. From the historical data (time/date), $P(t)$, $T_{out\text{-}of\text{-}door}$ and $V_{Wind}$ gathered covering seasonal weather plus random weather plus local weather a multivariable correlation is computed.

A complementary method is to construct a computer algorithm equivalent model for the thermal heating and heat loss mechanisms for each structure and then refine the model parameters from the historic power utilization and environmental data.

3. Power Storage Forecast

Figure 10:
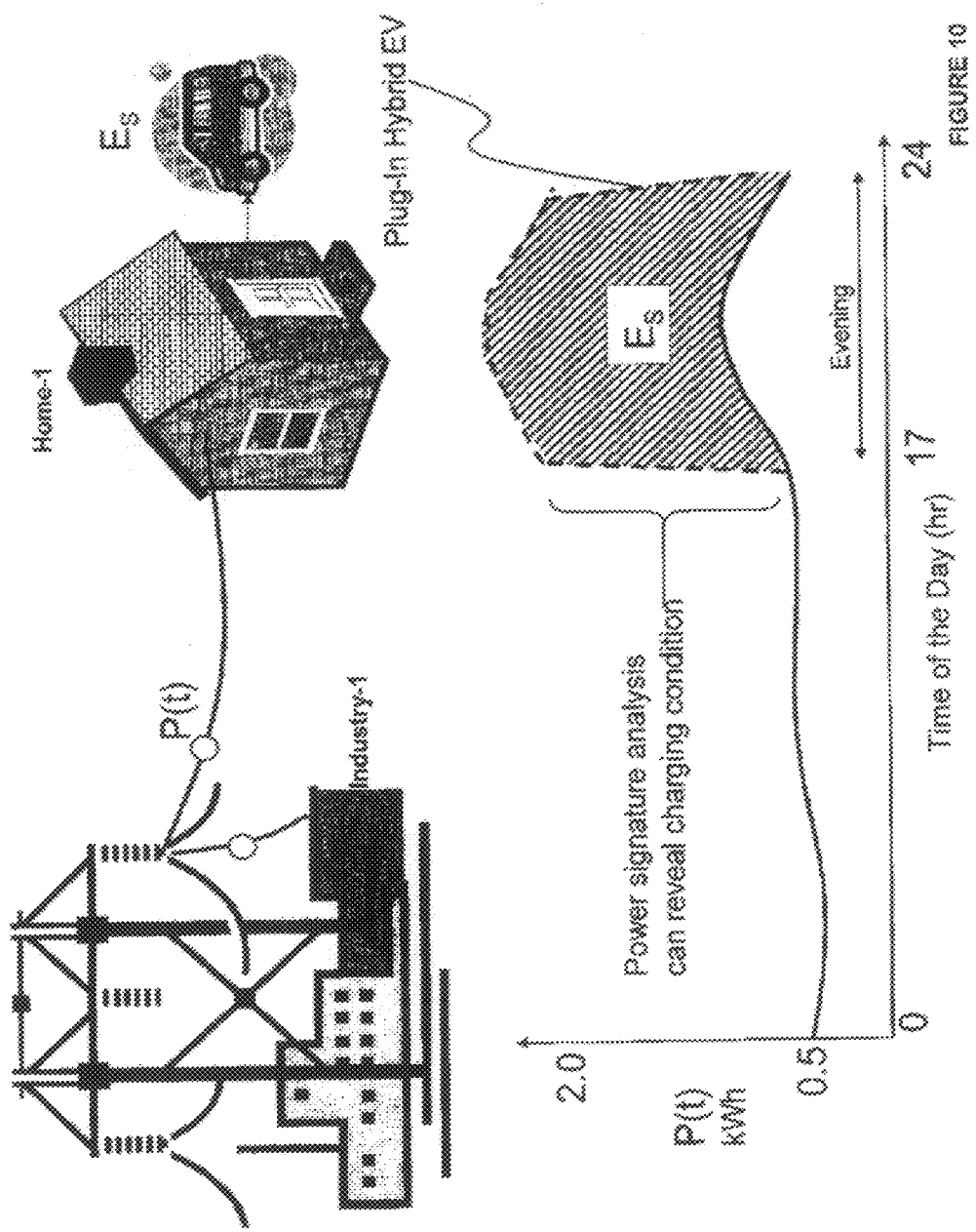
FIG. 10 is a forecast model for power utilization showing a power storage forecast model with P(t) as a function of time according to the present invention.

New battery technologies and other forms of storage can be used to moderate the peak power consumption from the grid. FIG. 10, for example, shows a battery-based storage becoming an important part of the energy infrastructure. E is the determined energy stored in a house hold. If a household has the capability to use its electric car batteries as a storage unit, then energy utilization patterns may become harder to forecast. It will be difficult to estimate the energy stored from the power delivered from the grid and estimated solar power (that a household may have) because the consumption for other appliances is not known, and privacy rules may prevent gathering any more details. New techniques can be developed, for example, by analyzing the power consumption signature (steady or intermittent), to obtain a better understanding of the internal electric state of a household. Cumulative demand to charge the electric batteries across a municipality or other unit could become significant and thus may corrupt any energy demand forecast.

4. Power Control Using Forecast Data

Figure 11:
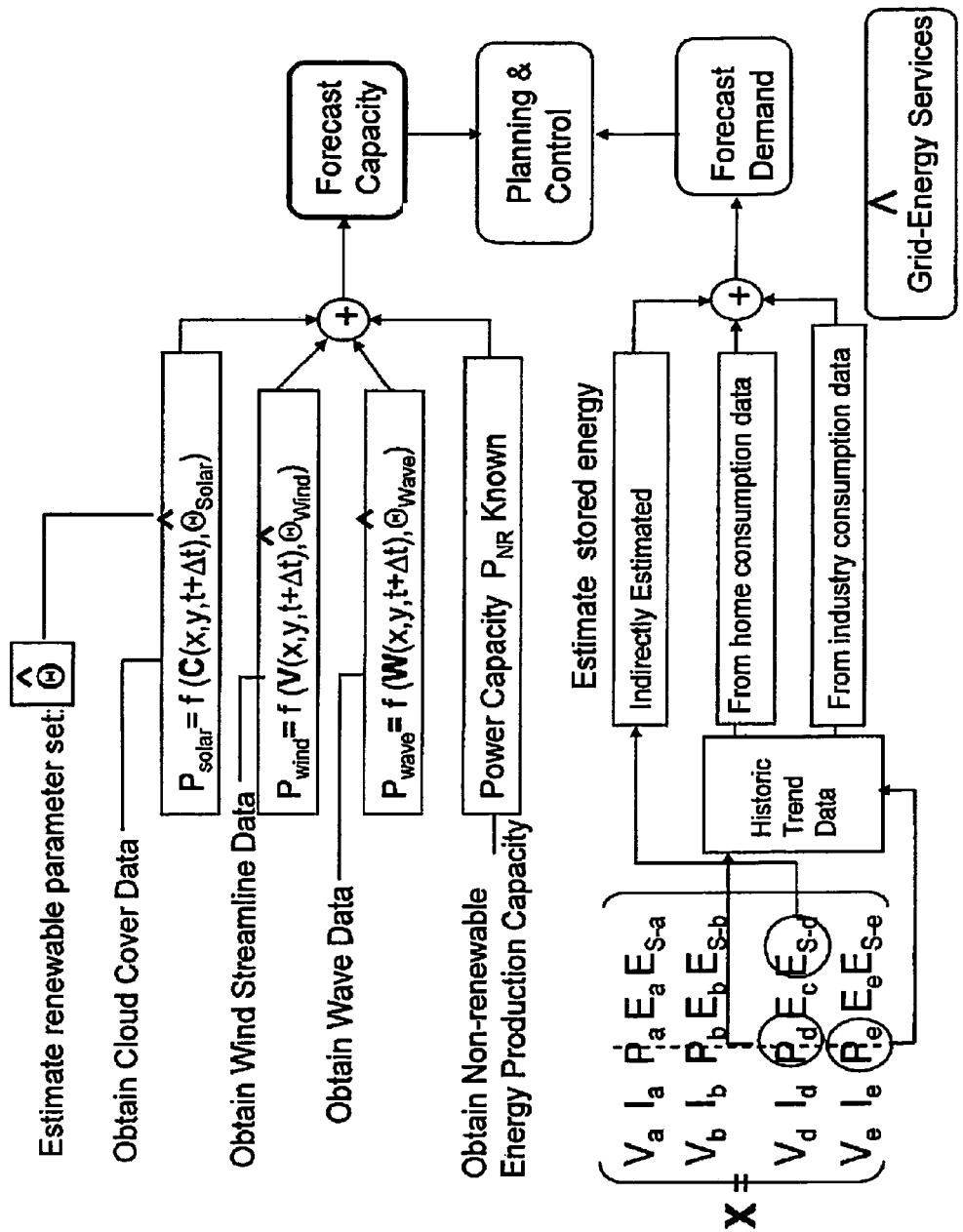
FIG. 11 summarizes the forecasting methods to determine the supply and demand condition of the electric grid according to the present invention.

FIG. 11 summarizes the integrated structure of the forecasting method that has been described so far to determine the supply and demand condition of the electric grid. Elements discussed in FIG. 9 contribute to the forecast of power generation capacity shown on top half of FIG. 11. The power demand forecast shown in bottom half of FIG. 11 is obtained from estimated consumption data (FIG. 9) and stored energy (FIG. 10). With these methods implemented, planning and control can be intelligently done to balance the supply and demand limitations encountered within an electric system. If solar, wind and wave power generated on a given day is expected to be high, fuel-based power generation can be ramped down, or the excess power can be transmitted for temporary storage.

On the other hand, if the maximum capacity is insufficient to meet the demand (e.g., summer heat) new fuel-based generation capability can be borrowed, electricity can be transmitted from somewhere with lower demand, or the electric unit price can be increased to reduce the demand. FIG. 11 contains a flow chart version of the invention with all the "sources" and "sinks" linked together.

The core strength of the present invention is derived from the estimation of theta-carat vector necessary to forecast energy production. Theta (θ) refers to a group of parameters that are required to compute the energy generation. For example, in the solar-energy field, theta may contain "conversion efficiency, cloud-diffusivity etc. These parameters normally change with time. Theta is a vector. The theta "carat" present in FIG. 11 is a best estimate of theta since actual theta is never known exactly. This symbology of "theta carat" (i.e., ^ atop θ) is used in the field of estimation.

5. Power Forecasting Service as a Business

Many independent electricity producers and transmission grid services cover a wide swath of different geographies in the US, and they do not spontaneously share information in real time that could help efficient pooling and sharing of power generation and delivery capability. New regulations may emerge to facilitate the pooling of real-time information, however. What is missing is a unifying electric information service provider to forecast and track the electric state at various system levels. Lack of power and energy information on a national scale creates inefficient production, transmission and consumption of electricity. Averting blackouts and brownouts is a challenge in the absence of a comprehensive energy information infrastructure. The estimated electric state is currently confined to various energy-related entities. Therefore, for a national level coordination of electric energy production, transmission and distribution an integrated "electric state" service is warranted.

The forecasting operations will require high performance computer system as well as unique software. There are business entities or government branches who are keen to own a similar forecasting operation may indeed be open to purchase the hardware/software units instead of signing up for the forecasting services. In both cases IBM can benefit from this investment.

Figure 12:
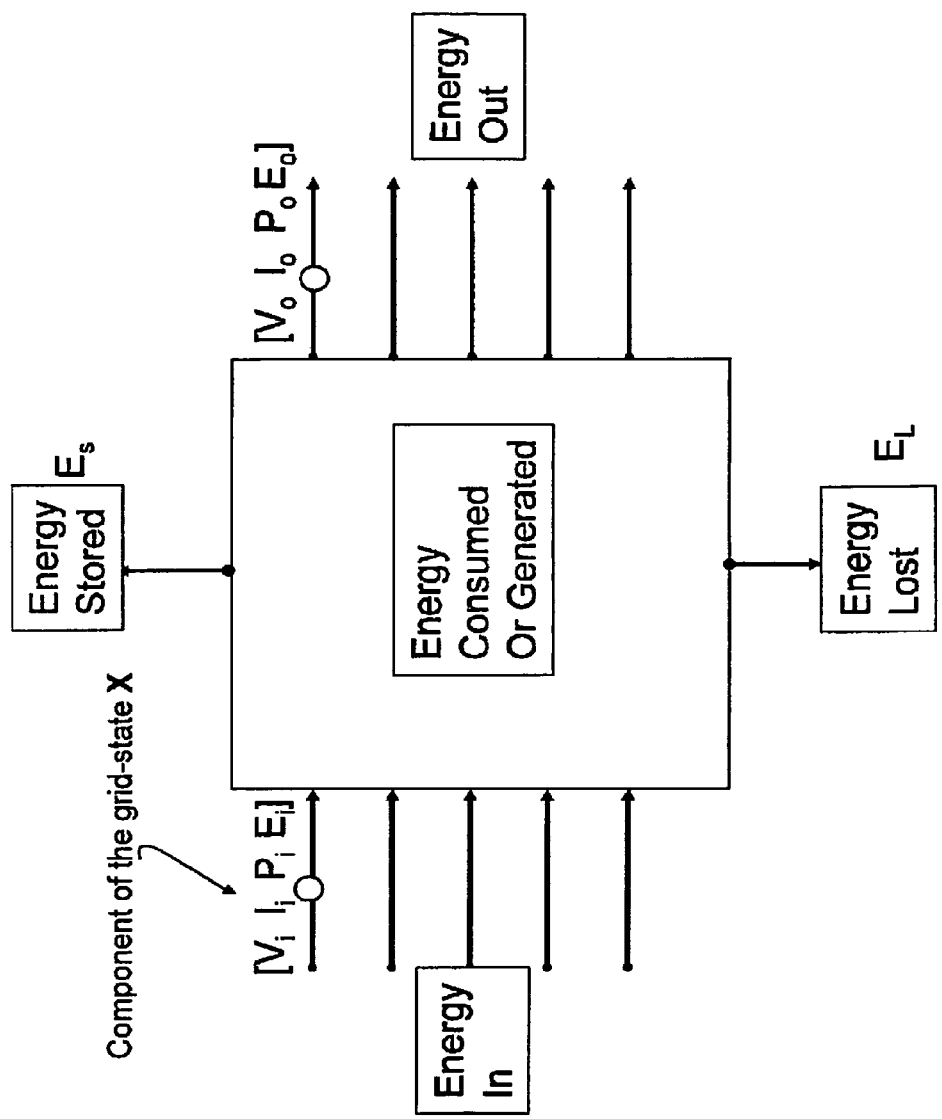
FIG. 12 defines a four port building block facilitating systematic building of a meso-scale energy model from micro-scale information according to the present invention.

FIG. 12 defines a building block that would facilitate systematic building of a meso-scale energy model from micro-scale information. The building block enforces a structure so that modeling software with appropriate parameters is established.

At the micro-scale (e.g., a house hold), electric energy can be received from multiple sources (on and off grid) and/or transmitted to multiple appliances. The difference between the two components is the energy stored within a house hold. The stored energy could be used later when prices or demand are higher. The "loss" term indicated can capture the effect of transmission lines. The 4 port building block for energy flow can help establish a "software module" that can be replicated with different parameters to build a meso-scale model.

Figure 13:
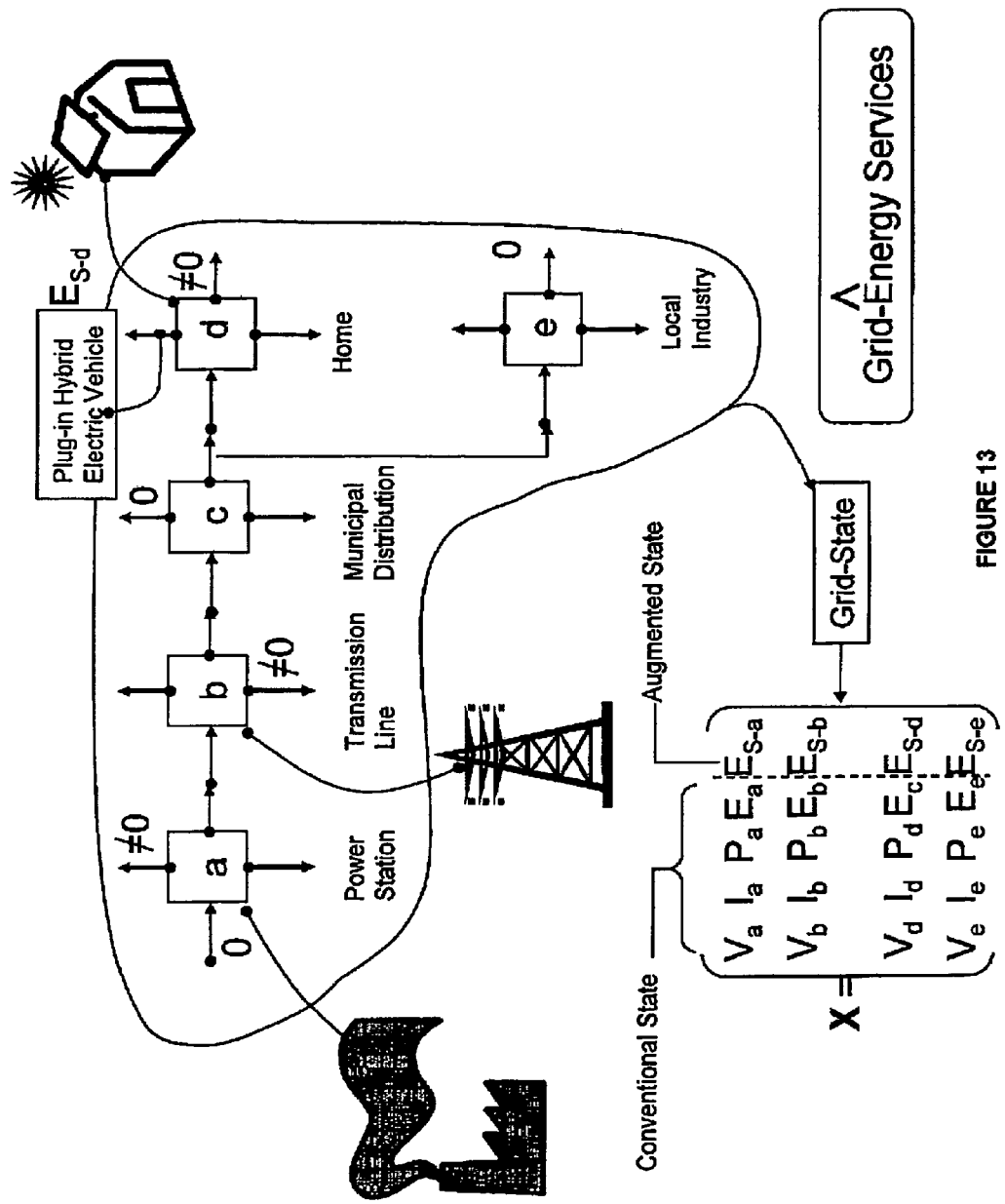
FIG. 13 is a synthesizing energy flow model showing how the four port building block of FIG. 12 is repeated to generate a large scale model of a defined municipal entity.

FIG. 13 shows how the building block of FIG. 12 is repeated to generate a large scale model of a defined entity, for example, a municipality. Observe that various subsystems have different characteristics. Some have energy-producing capability, some only consume, some transmit energy while incurring a loss, etc.

Figure 14:
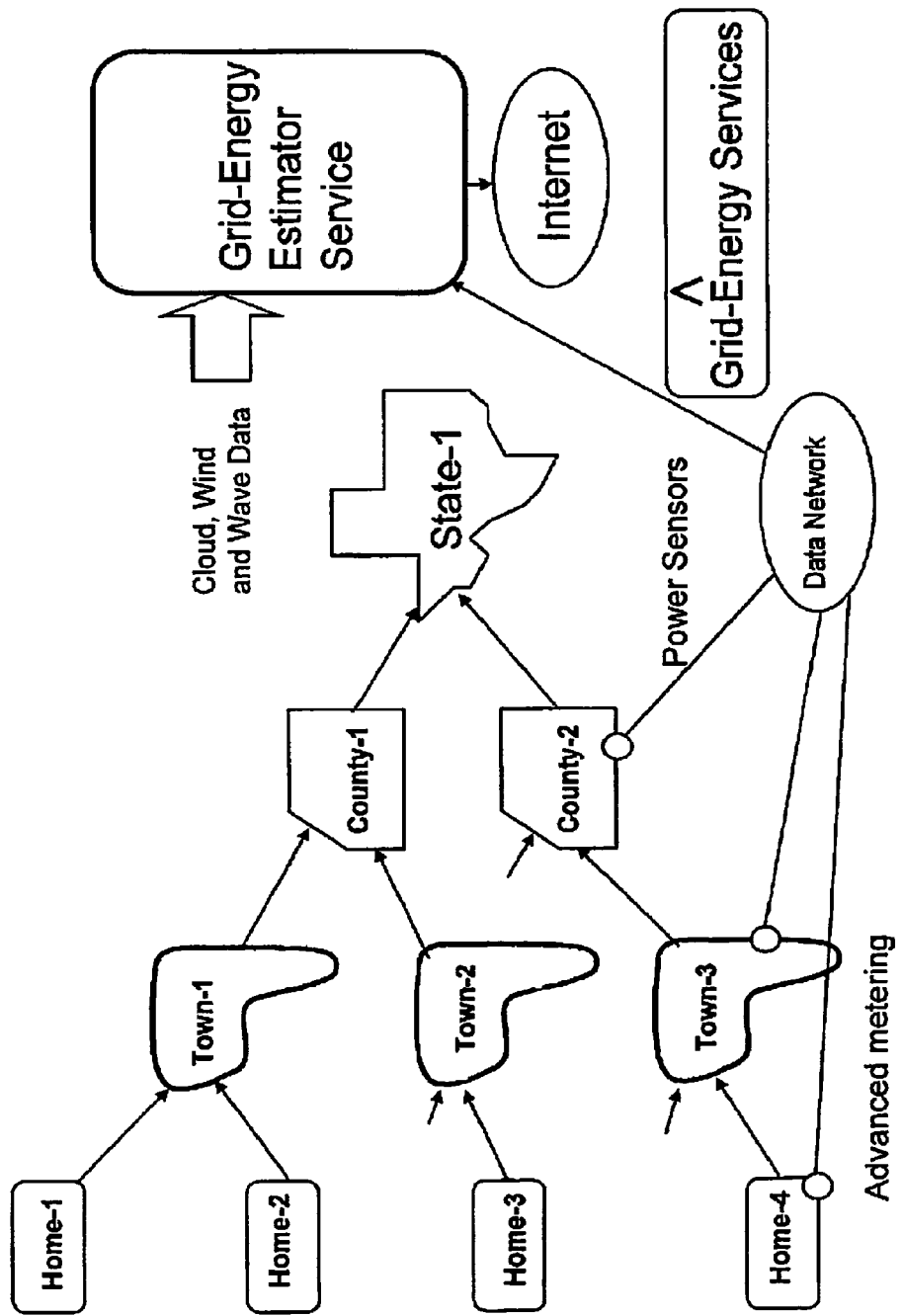
FIG. 14 is a micro to meso scale energy model showing the integration of micro-scale models to a meso-scale energy forecasting model that can be operated as a 24/7 service.

FIG. 14 shows the integration of micro-scale models to a meso-scale energy forecasting model that can be operated as a 24/7 service. For enhanced projection capability, weather data must be augmented into the computation.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to the instant Figures, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While all of the fundamental characteristics and features of the present apparatus of the disclosed invention have been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that any such substitutions, modifications, and variations may be made by those skilled in the art without departing from the spirit or scope of the invention. Consequently, all such modifications and variations are included within the scope of the invention as defined by the following claims.

What I claim and desire to protect by Letters Patent is:

1. A computer program product comprising a computer readable medium including a computer readable program, wherein said computer readable program when executed on a computer causes the computer to establish a power forecasting service model for use in conjunction with a system, said computer readable program comprising estimating energy production, forecasting utilization of said energy and storing said energy, for use in a system by maintaining a balance between a plurality of sources of energy and a plurality of user-sinks thereof, said computer readable program utilizing:

at least a first renewable source of said energy sources having an energy output which fluctuates due to environmental energy generation factors;

at least a second non-renewable source of said energy sources having an energy output which is accurately controllable through correspondingly accurate control of fuel consumption;

at least a first environmentally dependent sink of said energy sinks being characterized by which is subject to an energy consumption factor which fluctuates due to environmental energy consumption factors; and at least a second directly controllable sink of said energy-sinks which is subject to an energy consumption factor which is accurately controllable through correspondingly accurate regulation of controllable energy consumption factors, said computer readable program further comprising:

a) taking measurements to obtaining a first renewable energy source forecast for each said environmental energy generation factor based on said measurements taken thereof;

b) based on said first renewable energy source forecast, estimating an energy output for said first renewable energy source at a selected point in time;

c) obtaining a sink forecast for each said environmental energy consumption factor based on measurements thereof;

d) based on said sink forecast, estimating an energy consumption value for said first sink at said selected point in time;

e) regulating at least one of said fuel consumption by said second non-renewable source of energy, and regulating said energy consumption by said second sink in order to maintain said balance between said plurality of sources of energy and said plurality of user-sinks thereof.

2. The computer program product as set forth in claim 1, wherein said first source is selected from a wind generator, a photovoltaic solar cell, or wave-energy generator and where said environmental energy generation factors comprise wind velocity, cloud cover and wave height during selected time periods.

3. The computer program product as set forth in claim 1, wherein said environmental energy consumption factors comprise outside air temperature, humidity, wind speed and precipitation.

4. The computer program product as set forth in claim 1, wherein said controllable energy consumption factors are selected from thermostat temperature or rate of production (e.g., in case of say steel manufacturing).

5. The method set forth in claim 1, wherein said source forecast employs a multiplicity of geographically distributed sensors to provide voltage, current and power data corresponding to electric energy producers, consumers, distributors and transmitters at periodic time intervals.

6. The computer program product set forth in claim 5 wherein said source forecast is transmitted through a wired or wireless link to a communication network.

7. A The computer program product set forth in claim 6 wherein a computer receives data from said communication network and generates a unified estimate of an electric state of the an electric grid system in a given locality using an intelligent algorithm, wherein a said computer receives: a.) present weather forecast data including cloud cover, wind streamline and wave height/period to estimate the expected energy output from renewable sources and upgrade the model parameters to match the sensor-based power data; b.) combines weather forecast data, whereby a renewable energy model computes projected energy generation by the renewable energy sources; c.) uses energy producer capacity information and projected renewable energy forecasts and creates therefrom an algorithm which constructs maximum, most likely and minimum energy generation forecasts for the selected grid system in a given locality.

8. The computer program product set forth in claim 7, wherein said computer develops historical and present consumer sensor data and evaluates: consumer power usage model; consumer power storage model; consumer seasonal and random usage; characteristics consumer weather-dependent energy usage behavior.

9. The computer program product set forth in claim 7, wherein combining said weather forecast and said consumer power consumption usage models, said algorithm generates projected demand for the said given locality.

10. The computer program product set forth in claim 7, wherein power generation and demand estimates and forecasts are replicated to adjoining regions of interest, and eventually an aggregate meso-scale model for a whole nation or other power-sharing area is established.

11. The computer program product set forth in claim 7, wherein the grid-state estimation and forecast is shared 24/7 with business entities.

12. Additional services, such as blackout and brownout potential, can be evaluated and prevailing weather conditions.

13. A computer program product comprising a computer readable medium including a computer readable program, wherein said computer readable program when executed on a computer causes the computer to forecast the power and energy state of an electric system comprising:
   estimating an electric power production renewable energy source, said energy source selected from the group consisting of solar, wind and wave energy, said estimate being based upon technology-dependent parameters and weather-driven variables, said parameters and said variables derived from distributed power sensors, satellite-based cloud cover images, ground-based wind velocity data and ocean-based wave height/period data respectively;
   forecasting national power utilization sink levels wherein the impact of weather including temperature, humidity and wind on consumption by a system is correlated to establish a model from historical data and applied for enhanced accuracy of consumption projection;
   estimating stored energy available for time delayed consumption;
   integrating said production, utilization and storage, to establish a power-forecasting service model to provide an "energy map" displaying the power generation or consumption forecast to detailed databases of an "energy-state" of a geographic entity.

14. The computer program product for forecasting the power and energy state of an electric system defined in claim 13 wherein said energy source is solar and wind energy.

15. The computer program product for forecasting the power and energy state of an electric system defined in claim 14 wherein said solar energy is a composite of solar irradiance measured directly through the atmosphere, diffused through a system of clouds and reflected from objects on the terrain, so that the solar power produced is calculated using the formula:

$$P_{solar} = \eta(A_{diffused}E_{diffused} + A_{direct}E_{direct} + A_{reflected}E_{reflected})$$

wherein $\eta$ represents the conversion efficient of the solar array, A is the effective area presented to each irradiance component and E is power density falling on the respective area.

16. The computer program product for forecasting the power and energy state of an electric system defined in claim 15 wherein the value of $P_{solar}$ is generalized to $$P_{solar} = f(C(x,y,t), \Theta_{Solar})$$

wherein C(x,y,t) represents cloud related geometric parameters and $\Theta_{Solar}$ is a parameter vector representing properties in the system prone to error;
estimating the value of $\Theta_{Solar}$ to determine $\Theta_{Solar}$ hat and based upon said formula, the amount of solar power converted to electricity power is calculated by taking measurements $$P_{solar}(t) = f(C(x,y,t), \Theta_{Solar}\text{hat})$$

comparing the initial estimate of said parameter vector with the actual value and determining that the values are substantially equal, the forecast for solar power in a future time is calculated according to:

$$P_{solar}(t) = f(C(x,y,t+\Delta t), \Theta_{Solar}\text{hat})$$

wherein $\Theta_{Solar}$ hat represents a parameter set that may require refinement based upon measured solar data.

17. The computer program product for forecasting the power and energy state of an electric system defined in claim 13 wherein the energy source is wind power, wherein a collection of variables representing vector V(x,y,t) is obtained using a sensor measuring speed, density, temperature, and direction of said wind, with the result that the wind power available to a wind turbine is computed as:

$$P_{wind\text{-}input}(t) = [AV(t)][\tfrac{1}{2}]\rho(t)V2(t)]$$

wherein the velocity V(t) is the vector normal to the plane of rotation of a wind turbine with an area A and $\rho$ is the wind turbine conversion efficiency.

18. The computer program product for forecasting the power and energy state of an electric system defined in claim 17 wherein said collection of variables are measured and corresponding electric power output due to wind is written as:

$$P_{wind} = \eta[P_{wind\text{-}input}] = \eta f(V(x,y,t), \Theta_{Wind})$$

wherein $\eta$ represents the conversion factor for the system, and based upon said results, the estimated electric power $P_{wind}$ (t) is computed:

$$P_{wind} = f(V(x,y,t), \Theta_{Wind}\text{hat})$$

wherein $\Theta_{Wind}$ hat represents a parameter set that may require refinement based upon measured power data.

19. The computer program product for forecasting the power and energy state of an electric system defined in claim 13 wherein the energy source is wave power, wherein a collection of variables representing vector W(x,y,t) is obtained using a sensor measuring wave height, wave velocity and wave periodicity, with the result that the wave power available to a mechanism that converts wave motion into electromechanical means for delivering power is computed as:

$$P_{Wave} = f(V(x,y,t), \Theta_{Wave}\text{hat})$$

wherein W(x,y,t) represents wave related properties at time "t" and $\Theta_{Wave}$ hat corresponds to parameters requiring estimation to minimize forecast error.

20. A computer program product comprising a computer readable medium including a computer readable program, wherein said computer readable program when executed on a computer causes the computer to forecast the supply and demand condition of an electric grid using renewable and non-renewable sources of electric power comprising:
   forecasting total electrical power capacity which is the sum of renewable and non-renewable energy sources;

forecasting the total renewable source of electric power using a sensor network to:

obtain cloud cover data according to the relationship:

$$P_{Solar}(t)=f(C(x,y,t+\Delta t),\Theta_{Solar}\text{hat})$$

obtain wind streamline data according to the relationship:

$$P_{Wind}(t)=f(V(x,y,t+\Delta t),\Theta_{wind}\text{hat})$$

obtain wave data according to the relationship:

$$P_{Wave}(t)=f(W(x,y,t+\Delta t),\Theta_{Wave}\text{hat})$$

wherein (x,y) in each instance above is location, t is time dependent and $\Theta_{wave}$ hat is an estimate of a selected group of parameters from each power source, not yet known, which are estimated using sensor data and equations governing basic physics of power conversion;

determining the non-renewable source of electric power by obtaining known non-renewable energy power capacity;

combining said data obtained from said renewable sources with said known non-renewable energy user capacity to result in information that comprises a total forecast capacity;

said combined data is composed into an electric state vector X which defines location (x,y) and is time (t) dependent and incorporates transmission line voltage (V), current (I), power (P), energy (E) parameters therein;

using the parameters in said X state, estimating stored energy from resources that are used in forming direct and indirect estimates, that are based upon historic trend data from home consumption data and from industry data;

combining said estimates obtained from said X state to result in information that comprises a total forecast demand;

evaluating forecast capacity and forecast demand, in a planning and control stage, and then balancing supply and demand limitations within an electric system.

21. The computer program product for forecasting the supply and demand condition of an electric grid using renewable and non-renewable sources of electric power defined in claim 20 wherein:

collecting said data emanating from said sensor network relating to renewable wind, solar and wave energy sources are transmitted by wireless and transmission line means;

collecting weather data transmitted by satellite means; and collecting data from said non-renewable energy source at locations along its transmission path between a power generating facility and an ultimate user and storing same in a data network, combining and supplying said data collections to a data network planning and control stage which comprises an entity that receives multi-channel measurements derived from said sensor network and detailed characteristics of present and future weather conditions.

22. An article of manufacture comprising a computer usable medium having computer readable program code means embodied therein for causing a forecasting of electrical energy production and utilization subject to uncertain environmental variables, the computer readable program code means in said article of manufacture comprising computer readable program code means for causing a computer to effect:

estimating an electric power production renewable energy source, said energy source selected from the group consisting of solar, wind and wave energy, said estimate being based upon technology-dependent parameters and weather-driven variables, said parameters and said variables derived from distributed power sensors, satellite-based cloud cover images, ground-based wind velocity data and ocean-based wave height/period data respectively;

forecasting national power utilization sink levels wherein the impact of weather including temperature, humidity and wind on consumption by a system is correlated to establish a model from historical data and applied for enhanced accuracy of consumption projection;

estimating stored energy available for time delayed consumption;

integrating said production, utilization and storage, to establish a power-forecasting service model to provide an "energy map" displaying the power generation or consumption forecast to detailed databases of an "energy-state" of a geographic entity.

23. An article of manufacture comprising a computer usable medium having computer readable program code means embodied therein for causing a forecasting of electrical energy production and utilization subject to uncertain environmental variables, the computer readable program code means in said article of manufacture comprising computer readable program code means for causing a computer to effect: forecasting total electrical power capacity which is the sum of renewable and non-renewable energy sources;

forecasting the total renewable source of electric power using a sensor network to:

obtain cloud cover data according to the relationship:

$$P_{solar}(t)=f(C(x,y,t+\Delta t),\Theta_{Solar}\text{hat})$$

obtain wind streamline data according to the relationship:

$$P_{wind}(t)=f(V(x,y,t+\Delta t),\Theta_{Wind}\text{hat})$$

obtain wave data according to the relationship:

$$P_{wave}(t)=f(W(x,y,t+\Delta t),\Theta_{Wave}\text{hat})$$

wherein (x,y) in each instance above is location, t is time dependent and $\Theta_{Wave}$ hat is an estimate of a selected group of parameters from each power source, not yet known, which are estimated using sensor data and equations governing basic physics of power conversion;

determining the non-renewable source of electric power by obtaining known non-renewable energy power capacity;

combining said data obtained from said renewable sources with said known non-renewable energy user capacity to result in information that comprises a total forecast capacity;

said combined data is composed into an electric state vector X which defines location (x,y) and is time (t) dependent and incorporates transmission line voltage (V), current (I), power (P), energy (E) parameters therein;

using the parameters in said X state, estimating stored energy from resources that are used in forming direct and indirect estimates, that are based upon historic trend data from home consumption data and from industry data;

combining said estimates obtained from said X state to result in information that comprises a total forecast demand;

evaluating forecast capacity and forecast demand, in a planning and control stage, and then balancing supply and demand limitations within an electric system.

24. A computer program product comprising a computer usable medium having computer readable program code means embodied therein for causing a forecasting of electrical energy production and utilization subject to uncertain environmental variables, the computer readable program code means in said computer program product comprising computer readable program code means for causing a computer to effect:

estimating an electric power production renewable energy source, said energy source selected from the group consisting of solar, wind and wave energy, said estimate being based upon technology-dependent parameters and weather-driven variables, said parameters and said variables derived from distributed power sensors, satellite-based cloud cover images, ground-based wind velocity data and ocean-based wave height/period data respectively;

forecasting national power utilization sink levels wherein the impact of weather including temperature, humidity and wind on consumption by a system is correlated to establish a model from historical data and applied for enhanced accuracy of consumption projection;

estimating stored energy available for time delayed consumption;

integrating said production, utilization and storage, to establish a power-forecasting service model to provide an "energy map" displaying the power generation or consumption forecast to detailed databases of an "energy-state" of a geographic entity.

25. A computer program product comprising a computer usable medium having computer readable program code means embodied therein for causing a forecasting electrical energy production and utilization subject to uncertain environmental variables, said computer readable program code means in said computer program product comprising computer readable program code means for causing a computer to effect:

forecasting total electrical power capacity which is the sum of renewable and non-renewable energy sources;

forecasting the total renewable source of electric power using a sensor network to:

obtain cloud cover data according to the relationship:

$$P_{Solar}(t)=f(C(x,y,t+\Delta t),\Theta_{Solar}\text{hat})$$

obtain wind streamline data according to the relationship:

$$P_{Wind}(t)=f(V(x,y,t+\Delta t),\Theta_{wind}\text{hat})$$

obtain wave data according to the relationship:

$$P_{Wave}(t)=f(W(x,y,t+\Delta t),\Theta_{wave}\text{hat})$$

wherein (x,y) in each instance above is location, t is time dependent and $\Theta_{wave}$ hat is an estimate of a selected group of parameters from each power source, not yet known, which are estimated using sensor data and equations governing basic physics of power conversion;

determining the non-renewable source of electric power by obtaining known non-renewable energy power capacity;

combining said data obtained from said renewable sources with said known non-renewable energy user capacity to result in information that comprises a total forecast capacity;

said combined data is composed into an electric state vector X which defines location (x,y) and is time (t) dependent and incorporates transmission line voltage (V), current (I), power (P), energy (E) parameters therein;

using the parameters in said X state, estimating stored energy from resources that are used in forming direct and indirect estimates, that are based upon historic trend data from home consumption data and from industry data;

combining said estimates obtained from said X state to result in information that comprises a total forecast demand;

evaluating forecast capacity and forecast demand, in a planning and control stage, and then balancing supply and demand limitations within an electric system.

* * * * *